United States Patent
Morita et al.

(10) Patent No.: US 9,210,371 B2
(45) Date of Patent: Dec. 8, 2015

(54) TRANSMISSION TERMINAL, TRANSMISSION SYSTEM AND PROGRAM

(71) Applicants: Kenichiro Morita, Tokyo (JP); Takuya Imai, Tokyo (JP); Shoh Nagamine, Kanagawa (JP)

(72) Inventors: Kenichiro Morita, Tokyo (JP); Takuya Imai, Tokyo (JP); Shoh Nagamine, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 87 days.

(21) Appl. No.: 14/152,149

(22) Filed: Jan. 10, 2014

(65) Prior Publication Data

US 2014/0240450 A1 Aug. 28, 2014

(30) Foreign Application Priority Data

Feb. 28, 2013 (JP) ................................. 2013-038907

(51) Int. Cl.
| | |
|---|---|
| H04N 7/14 | (2006.01) |
| H04L 29/06 | (2006.01) |
| H04L 12/18 | (2006.01) |
| H04N 7/15 | (2006.01) |

(52) U.S. Cl.
CPC ............ *H04N 7/147* (2013.01); *H04L 12/1822* (2013.01); *H04L 65/605* (2013.01); *H04N 7/15* (2013.01)

(58) Field of Classification Search
CPC ........... H04N 7/147; H04N 7/16; H04N 7/14; H04N 7/142; H04L 12/1822; H04L 65/605
USPC ........ 348/14.01–14.16; 379/202.01; 709/204, 709/207
See application file for complete search history.

(56) References Cited

U.S. PATENT DOCUMENTS

| | | | |
|---|---|---|---|
| 5,963,246 A | 10/1999 | Kato | |
| 8,289,368 B2* | 10/2012 | Gopal et al. | ............... 348/14.09 |
| 2007/0233802 A1* | 10/2007 | Kulkarni | ....................... 709/207 |
| 2012/0002003 A1 | 1/2012 | Okita et al. | |

FOREIGN PATENT DOCUMENTS

| | | |
|---|---|---|
| JP | 05-037931 | 2/1993 |
| JP | 05-037933 | 2/1993 |
| JP | 2751923 | 5/1998 |
| JP | 10-164240 | 6/1998 |
| JP | 2011-045028 | 3/2011 |
| JP | 2012-075073 | 4/2012 |

* cited by examiner

*Primary Examiner* — Melur Ramakrishnaiah
(74) *Attorney, Agent, or Firm* — Oblon, McClelland, Maier & Neustadt, L.L.P.

(57) ABSTRACT

A transmission terminal is connected to a management apparatus, which stores information on a destination in a first communication mode associated with a plurality of transmission terminals, via a network. The transmission terminal includes a transmission unit that sends data including at least voice data; a voice input unit, that inputs the voice data; and a determination unit that determines whether the transmission terminal is in the first communication mode or not based on an input volume level of the voice data, input by the voice input unit. When the determination unit determines that the transmission terminal is in the first communication mode, the data sent by the transmission unit is relayed only to an other transmission terminal of the transmission terminals, which communicate with the transmission terminal. The other transmission terminal corresponds to the destination associated with the transmission terminal in the management apparatus.

8 Claims, 17 Drawing Sheets

FIG.1

RELAY DEVICE MANAGEMENT TABLE

| RELAY DEVICE ID | OPERATIONAL STATUS | RECEPTION TIME | IP ADDRESS OF RELAY DEVICE |
|---|---|---|---|
| 111a | ONLINE | 2009.11.10.13:00 | 1.2.1.2 |
| 111b | ONLINE | 2009.11.10.13:10 | 1.2.2.2 |
| 111c | OFFLINE | 2009.11.10.13:20 | 1.3.1.2 |
| 111d | ONLINE | 2009.11.10.13:30 | 1.3.2.2 |

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

TERMINAL AUTHENTICATION MANAGEMENT DB 5002

FIG.8

TERMINAL MANAGEMENT TABLE — TERMINAL MANAGEMENT DB 5003

| TERMINAL ID | NAME OF DESTINATION | OPERATIONAL STATUS | RECEPTION TIME | IP ADDRESS OF TERMINAL |
|---|---|---|---|---|
| 01aa | JAPAN, TOKYO OFFICE, TERMINAL AA | ONLINE (CALL IS POSSIBLE) | 2009.11.10.13:40 | 1.2.1.3 |
| 01ab | JAPAN, TOKYO OFFICE, TERMINAL AB | OFFLINE | 2009.11.09.12:00 | 1.2.1.4 |
| ... | ... | ... | ... | ... |
| 01ba | JAPAN, OSAKA OFFICE, TERMINAL BA | ONLINE (HALT) | 2009.11.10.13:45 | 1.2.2.3 |
| 01bb | JAPAN, OSAKA OFFICE, TERMINAL BB | ONLINE (CALL IS POSSIBLE) | 2009.11.10.13:50 | 1.2.2.4 |
| ... | ... | ... | ... | ... |
| 01ca | US, NEW YORK OFFICE, TERMINAL CA | OFFLINE | 2009.11.10.12:45 | 1.3.1.3 |
| 01cb | US, NEW YORK OFFICE, TERMINAL CB | ONLINE (BUSY) | 2009.11.10.13:55 | 1.3.1.4 |
| ... | ... | ... | ... | ... |
| 01da | US, WASHINGTON D.C. OFFICE, TERMINAL DA | ONLINE (BUSY) | 2009.11.08.12:45 | 1.3.2.3 |
| 01db | US, WASHINGTON D.C. OFFICE, TERMINAL DB | ONLINE (CALL IS POSSIBLE) | 2009.11.10.12:45 | 1.3.2.4 |
| ... | ... | ... | ... | ... |

FIG.9

DESTINATION LIST
MANAGEMENT TABLE

| REQUEST SOURCE TERMINAL ID | DESTINATION TERMINAL ID (ID WITH SYMBOL "*" IS OBJECT OF CONFIDENTIAL COMMUNICATION) |
|---|---|
| 01aa | *01ab,···,*01ba,01bb,···,01ca,*01cb,01da,*01db,··· |
| 01ab | *01aa,01ca,*01cb |
| 01ba | *01aa,01ab,01ca,01cb,01da,01db |
| ··· | ··· |
| 01db | 01aa,01ab,01ba,···,01da,01ca,01cb,···,01da |

DESTINATION LIST MANAGEMENT DB 5004

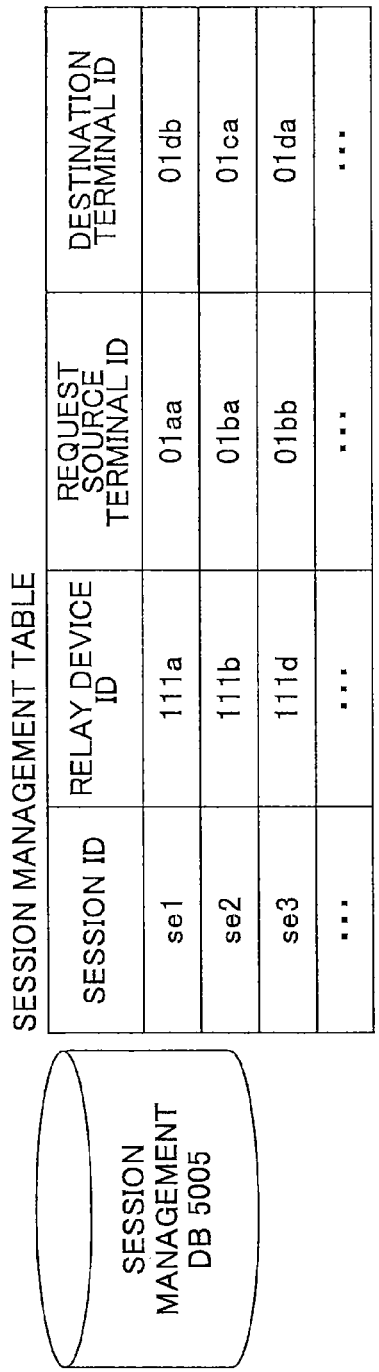

FIG.10

SESSION MANAGEMENT TABLE

| SESSION ID | RELAY DEVICE ID | REQUEST SOURCE TERMINAL ID | DESTINATION TERMINAL ID |
|---|---|---|---|
| se1 | 111a | 01aa | 01db |
| se2 | 111b | 01ba | 01ca |
| se3 | 111d | 01bb | 01da |
| ... | ... | ... | ... |

SESSION MANAGEMENT DB 5005

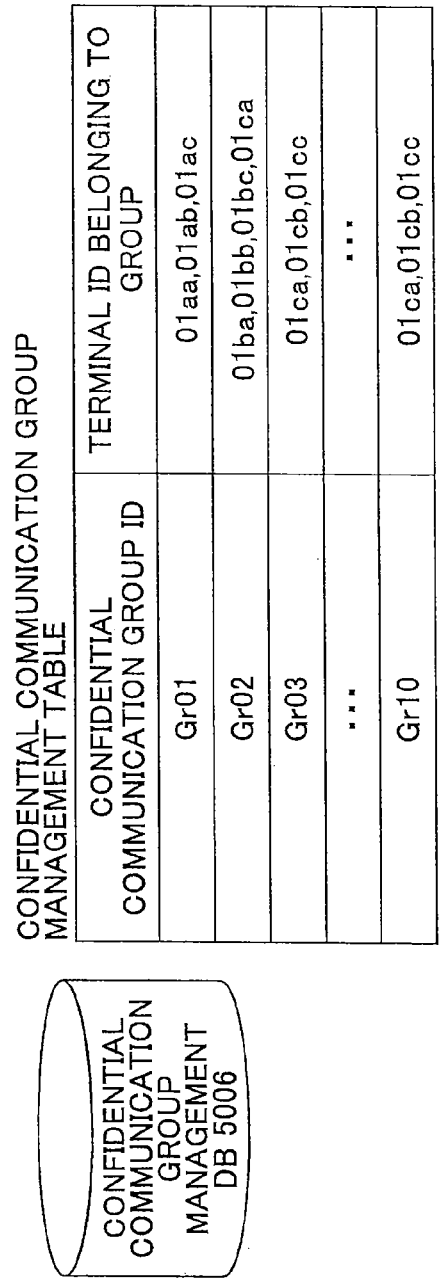

FIG.11

CONFIDENTIAL COMMUNICATION GROUP MANAGEMENT TABLE

| CONFIDENTIAL COMMUNICATION GROUP ID | TERMINAL ID BELONGING TO GROUP |
|---|---|
| Gr01 | 01aa,01ab,01ac |
| Gr02 | 01ba,01bb,01bc,01ca |
| Gr03 | 01ca,01cb,01cc |
| ... | ... |
| Gr10 | 01ca,01cb,01cc |

CONFIDENTIAL COMMUNICATION GROUP MANAGEMENT DB 5006

FIG. 16

DETERMINATION OF TRANSITION TO CONFIDENTIAL COMMUNICATION MODE

| PRESENT MODE | TRANSITION CONDITION | MODE TO TRANSITIONED | PROCESS |
|---|---|---|---|
| (1) NORMAL COMMUNICATION MODE (CONFIDENTIAL COMMUNICATION MODE "OFF") | (a) $Vt1 > V$ or $Vt2 < V$ | NORMAL COMMUNICATION MODE | |
| | (b) $Vt1 \leq V \leq Vt2$ | INTERIM CONFIDENTIAL COMMUNICATION MODE | • START TIMER FOR DURATION TIME t1<br>• NOTIFY USER IF "TRANSITION TO INTERIM CONFIDENTIAL COMMUNICATION MODE" |
| (2) INTERIM CONFIDENTIAL COMMUNICATION MODE (CONFIDENTIAL COMMUNICATION MODE "ON") | (c) $Vt2 < V$ | NORMAL COMMUNICATION MODE | • NOTIFY USER OF "TRANSITION TO NORMAL COMMUNICATION MODE"<br>• STOP TIMER FOR t1 |
| | (d) $V < Vt2$ AND TIME LONGER THAN T1 ELAPSES FROM START OF TIMER FOR t1 | CONFIDENTIAL COMMUNICATION MODE | • NOTIFY USER OF "TRANSITION TO CONFIDENTIAL COMMUNICATION MODE" |
| | (e) $V < Vt2$ AND ELAPSED TIME FROM START OF TIMER FOR t1 IS LESS THAN T1 | INTERIM CONFIDENTIAL COMMUNICATION MODE | • NOTIFY USER OF REMAINING TIME BEFORE TRANSITION TO CONFIDENTIAL COMMUNICATION MODE (REQUIRED FOR T1 TO ELAPSE) |
| (3) CONFIDENTIAL COMMUNICATION MODE (CONFIDENTIAL COMMUNICATION MODE "ON") | (f) $V \leq Vt3$ | CONFIDENTIAL COMMUNICATION MODE | • STOP TIMER FOR t2 |
| | (g) $Vt3 < V$ AND ELAPSED TIME FROM START OF TIMER FOR t2 IS LESS THAN T2 | CONFIDENTIAL COMMUNICATION MODE | • (IF TIMER HAS NOT STARTED) START TIMER FOR t2<br>• NOTIFY USER OF REMAINING TIME BEFORE TRANSITION TO NORMAL COMMUNICATION MODE (REQUIRED FOR T2 TO ELAPSE) |
| | (h) $Vt3 < V$ AND TIME LONGER THAN T2 ELAPSES FROM START OF TIMER FOR t2 | NORMAL COMMUNICATION MODE | • NOTIFY USER OF "TRANSITION TO NORMAL COMMUNICATION MODE"<br>• STOP TIMER FOR t2 |

TRANSMISSION TERMINAL, TRANSMISSION SYSTEM AND PROGRAM

BACKGROUND OF THE INVENTION

1. Field of the Invention

The disclosures herein generally relate to a transmission terminal, a transmission system and a program.

2. Description of the Related Art

Recently, a conference system to conduct a remote conference between remote locations via a communication network, such as the internet, has become popular. The attendees at remote locations can attend the conference in the same state as a real conference.

In the above-described remote conference system, a terminal device provided in a conference room on one side takes an image of an attendee and of the conference room, acquires a voice (sound) of the attendee, converts the image and the voice into digital data, and transmits the digital data to a terminal device on the other side. The terminal device of the other side receives the digital data, takes out the image and voice, and outputs the image and voice from a display device and a speaker, respectively.

Moreover, among the above-described remote conference systems, in which the image and voice can be transmitted to all the terminal devices, that participate the conference, a conference system supporting confidential communications has a function of communicating with a specified terminal device by transmitting an image and voice only to the specified terminal device.

Japanese Published Patent Application No. 2011-045028 discloses a conference relay device, which specifies a terminal device as a destination of a confidential communication, and begins and ends the confidential communication during a conference.

SUMMARY OF THE INVENTION

It is a general object of at least one embodiment of the present invention to provide a transmission terminal, a transmission system and a program that substantially obviates one or more problems caused by the limitations and disadvantages of the related art.

In one embodiment of the present invention, a transmission terminal is connected to a management apparatus, which stores information on a destination in a first communication mode associated with each of a plurality of the transmission terminals, via a network. The transmission terminal includes a transmission unit that sends data including at least voice data; a voice input unit, that inputs the voice data; and a determination unit that determines whether the transmission terminal is in the first communication mode or not based on an input volume level of the voice data, input by the voice input unit. When the determination unit determines that the transmission terminal is in the first communication mode, the data sent by the transmission unit is relayed only to an other transmission terminal of the transmission terminals that communicate with the transmission terminal. The other transmission terminal corresponds to the destination associated with the transmission terminal in the management apparatus.

In another embodiment of the present invention, a transmission system transmits data including at least voice data between a plurality of transmission terminals via a network. The transmission system includes a storage unit that stores information on a destination in a first communication mode associated with each of the plurality of transmission terminals; a reception unit that receives data sent from a first transmission terminal; a determination unit that determines whether the first transmission terminal is in the first communication mode or not based on an input volume level of voice data in the data; and a relay unit that, when the determination unit determines that the first transmission terminal is in the first communication mode, relays the data received at the reception unit only to a second transmission terminal of transmission terminals that communicate with the first transmission terminal, the second transmission terminal corresponding to the destination associated with the first transmission terminal in the storage unit.

In yet another embodiment of the present invention, a non-transitory computer-readable storage medium storing a program for causing a computer to perform a process of transmitting data from a transmission terminal, which is connected to a management apparatus, storing information on a destination in a first communication mode associated with each of a plurality of the transmission terminals, via a network. The process includes a step of converting an input voice into voice data; a step of sending data including at least the voice data; and a step of determining whether the transmission terminal is in the first communication mode or not based on an input volume level of the voice data. When the transmission terminal is determined to be in the first communication mode, the data is relayed only to an other transmission terminal of transmission terminals that communicate with the transmission terminal. The other transmission terminal corresponds to the destination associated with the transmission terminal in the management apparatus.

A method, an apparatus, a system, and a recording medium, to which a component, an expression, or an arbitrary combination of components of the present invention is directed, are also effective as aspects of the present invention.

According to the present invention, a transmission terminal, a transmission system and a program are provided, which facilitate a switching operation between normal communications and confidential communications.

BRIEF DESCRIPTION OF THE DRAWINGS

Other objects and further features of embodiments will be apparent from the following detailed description when read in conjunction with the accompanying drawings, in which:

FIG. 1 is a diagram schematically illustrating an example of a transmission system according to a present exemplary embodiment;

FIG. 8 is a diagram illustrating an example of a table for managing the terminal according to the present exemplary embodiment;

FIG. 9 is a diagram illustrating an example of a table for managing a destination list according to the present exemplary embodiment;

FIG. 10 is a diagram illustrating an example of a table for managing a session according to the present exemplary embodiment;

FIG. 11 is a diagram illustrating an example of a table for managing a group for confidential communications according to the present exemplary embodiment;

FIG. 16 is a diagram illustrating an example of a table for determining a transition between the communication modes according to the present exemplary embodiment;

DESCRIPTION OF THE PREFERRED EMBODIMENTS

In the following, embodiments of the present invention will be described with reference to the accompanying drawings.

Exemplary Embodiment

System

At first, a whole configuration of a transmission system according to the present exemplary embodiment will be described in the following, before explaining features of the present invention in detail.

Figure 1:
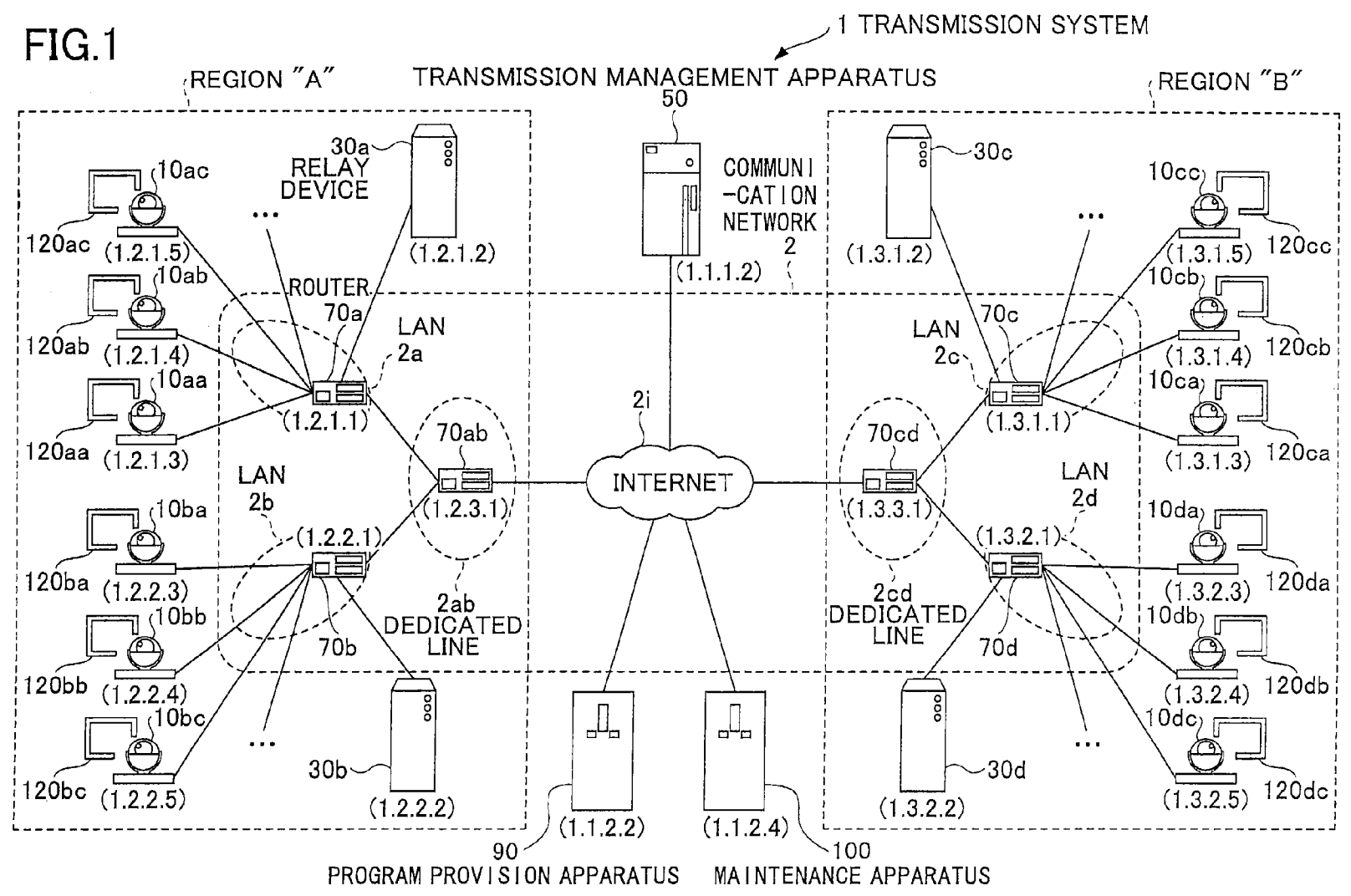
Figure 2:
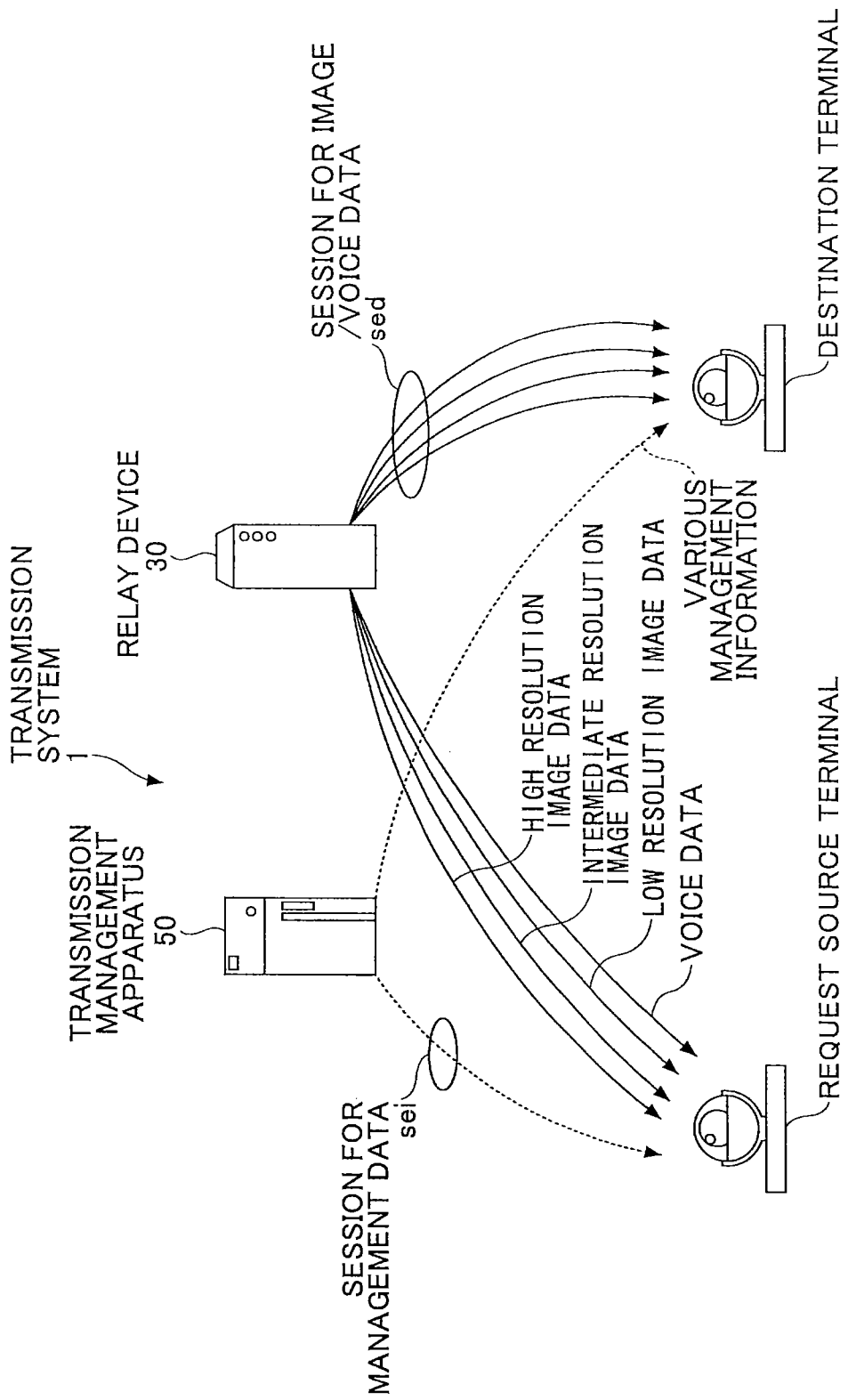
FIG. 2 is a conceptual diagram illustrating an example of a state of sending/receiving image data, voice data and management information in the transmission system according to the present exemplary embodiment.

FIG. 1 is a diagram schematically illustrating the transmission system 1 according to the present exemplary embodiment. FIG. 2 is a conceptual diagram illustrating a state of sending/receiving image data, voice data and management information in the transmission system 1.

The transmission system 1 includes a data provision apparatus, which transmits unidirectionally content data from one transmission terminal to the other transmission terminal via a transmission management apparatus, and a communication system, which transfers bidirectionally information, emotion, or the like among plural transmission terminals via a transmission management apparatus. The communication system transfers information, emotion, or the like in two directions among plural communication terminals (corresponding to the transmission terminals) via a communication management apparatus (corresponding to the transmission management apparatus), and is, for example, a television conference system, a television telephone system, or a mobile phone system.

The transmission system, according to the present exemplary embodiment, is a television conference system as an example of the communication system, and the transmission terminal is a television conference terminal as an example of the communication terminal. The transmission system 1, transmission management apparatus 50 and transmission terminal 10 will be explained in the following. That is, the transmission terminal 10 and the transmission management apparatus 50 can be applied not only to the television conference system, but also to the communication system, or the transmission system.

The transmission system 1, as shown in FIG. 1, includes plural transmission terminals 10 (10aa, 10ab, ... ), display devices 120 for each of the transmission terminals (120aa, 120ab, ... ), plural relay devices 30 (30a, 30b, 30c, and 30d), a transfer management apparatus 50, a program provision apparatus 90, and a maintenance apparatus 100.

The plural terminals 10 perform transmitting processing by sending/receiving image data and voice data as an example of content data.

In the following, a "transmission terminal" will be simply denoted as a "terminal", and a "transmission management apparatus" will be simply denoted as a "management apparatus". Moreover, an arbitrary terminal of the plural terminals (10aa, 10ab, ... ) is denoted as a "terminal 10". An arbitrary display device of the plural display devices (120aa, 120ab ... ) is denoted as a "display device 120". An arbitrary relay device of the plural relay devices (30a, 30b, 30c, and 30d) is denoted as a "relay device 30". Furthermore, a terminal as a request source, which has required starting the television conference, is denoted as a "request source terminal". A terminal, which is a destination of the request (destination of the relay), is denoted as a "destination terminal".

Moreover, as shown in FIG. 2, in the transmission system 1, between the request source terminal and the destination terminal, a session for management information sei in order to send/receive management information is established via the management apparatus 50. Furthermore, between the request source terminal and the destination terminal, four sessions in order to send/receive four data sets, i.e. image data in high resolution, image data in intermediate resolution, image data in low resolution and voice data, are established via the relay device 30. In the present exemplary embodiment, the four sessions are collectively denoted as a session for image/voice data "sed".

The relay device 30, shown in FIG. 1, relays or transfers content data between the plural terminals 10. The management apparatus 50 manages in an integrated fashion a login authentication process from the terminal 10, a status of speech of the terminal 10, the destination list, and a status of the communication of the relay device 30. An image of the image data may be a moving picture, a still image, or both the moving picture and the still image.

Plural routers (70a, 70b, 70c, 70d, 70ab and 70cd) select an optimal path to transmit the image data and voice data. In the following, an arbitrary router of the routers (70a, 70b, 70c, 70d, 70ab and 70cd) is denoted as a "router 70".

The program provision apparatus 90 is equipped with a hard disk (HD) 204 (see FIG. 4), which will be explained later, and stores a program for the terminal 10, which realizes various functions for the terminal 10, or makes the terminal 10 function as various means. The program provision apparatus 90 sends to the terminal 10 the program for the terminal 10. Moreover, in the HD 204 of the program provision apparatus 90, a program for the relay device 30, which realizes various functions for the relay device 30, or makes the relay device 30 function as various means, is also stored. The program provision apparatus 90 sends to the relay device 30 the program for the relay device 30. Furthermore, in the HD 204 of the program provision apparatus 90, a program for the transmission management, which realizes various functions for the management apparatus 50, or makes the management apparatus 50 function as various means, is also stored. The program provision apparatus 90 sends to the management apparatus 50 the program for the transmission management.

The maintenance apparatus 100 is a computer which maintains, manages or maintains at least one of the terminal 10, the relay device 30, the management apparatus 50 and the program provision apparatus 90. For example, in the case that the maintenance apparatus 100 is installed in one country and the terminal 10, the relay device 30, the management apparatus 50 or the program provision apparatus 90 is installed out of the country, the maintenance apparatus 100 performs the maintenance processing of keeping, managing, maintaining, or the like, for at least one of the terminal 10, the relay device 30, the management apparatus 50 and the program provision apparatus 90, remotely via the communication network 2. Moreover, the maintenance apparatus 100 performs maintenance processing of managing a model number, a production number, a sale destination, maintenance and inspection, a failure history or the like, for at least one of the terminal 10, the relay device 30, the management apparatus 50, and the program provision apparatus 90, without using the communication network 2.

The terminals (10aa, 10ab, 10ac, . . . ), the relay device 30a, and the router 70a are connected via a LAN (local area network) 2a so as to communicate with each other. The terminals (10ba, 10bb, 10bc, . . . ), the relay device 30b, and the router 70b are connected via a LAN 2b so as to communicate with each other. Moreover, the LAN 2a and the LAN 2b are connected via a dedicated line 2ab including a router 70ab so as to communicate with each other, and built in a predetermined region "A". For example, the region "A" is Japan, the LAN 2a is built in an office in Tokyo, and the LAN 2b is built in an office in Osaka.

On the other hand, the terminals (10ca, 10cb, 10cc, . . . ), the relay device 30c, and the router 70c are connected via a LAN 2c so as to communicate with each other. The terminals (10da, 10db, 10dc, . . . ), the relay device 30d, and the router 70d are connected via a LAN 2d so as to communicate with each other. Moreover, the LAN 2c and the LAN 2d are connected via a dedicated line 2cd including a router 70cd so as to communicate with each other, and build in a predetermined region "B". For example, the region "B" is the United States of America, the LAN 2c is built in an office in New York, and the LAN 2d is built in an office in Washington D.C. The region "A" and the region "B" are connected from the routers 70ab and 70cd, respectively, via the internet 2i so as to communicate with each other.

Moreover, the management apparatus 50 and the program provision apparatus 90 are connected to the terminals 10 and the relay devices 30 via the internet 2i. The management apparatus 50 and the program provision apparatus 90 may be installed in the region "A" or in the region "B", or may be installed outside the regions "A" and "B".

A communication network 2, according to the present exemplary embodiment, includes the LAN 2a, the LAN 2b, the dedicated line 2ab, the internet 2i, the dedicated line 2cd, the LAN 2c and the LAN 2d. The communication network 2 may include a section where wireless communications, such as Wi-Fi (Wireless Fidelity) or Bluetooth (registered trademark), not only wired communications, are performed. Furthermore, using different sessions for each resolution of image data is not indispensable. The number of sessions for image data may be one, less than three, or greater than three, according to the resolution.

Moreover, a combination of four integers, indicated below each of the terminals 10, the relay devices 30, the management apparatus 50, the routers 70, and the program provision apparatus 90 in FIG. 1, represents an IP (Internet protocol) address in a simple form of IPv4. For example, the IP address of the terminal 10aa is "1.2.1.3". Moreover, IPv6 may be adopted instead of the IPv4, but the IPv4 is employed for simplicity in the present exemplary embodiment.

The terminal 10 may be used not only for communication between different offices or between different rooms in the same office, but also for communication in the same room, between indoor and outdoor, or between outdoors. In the case that the terminal 10 is used outdoors, wireless communication, such as using a mobile phone communication network, is performed.

<Hardware>

Figure 3:
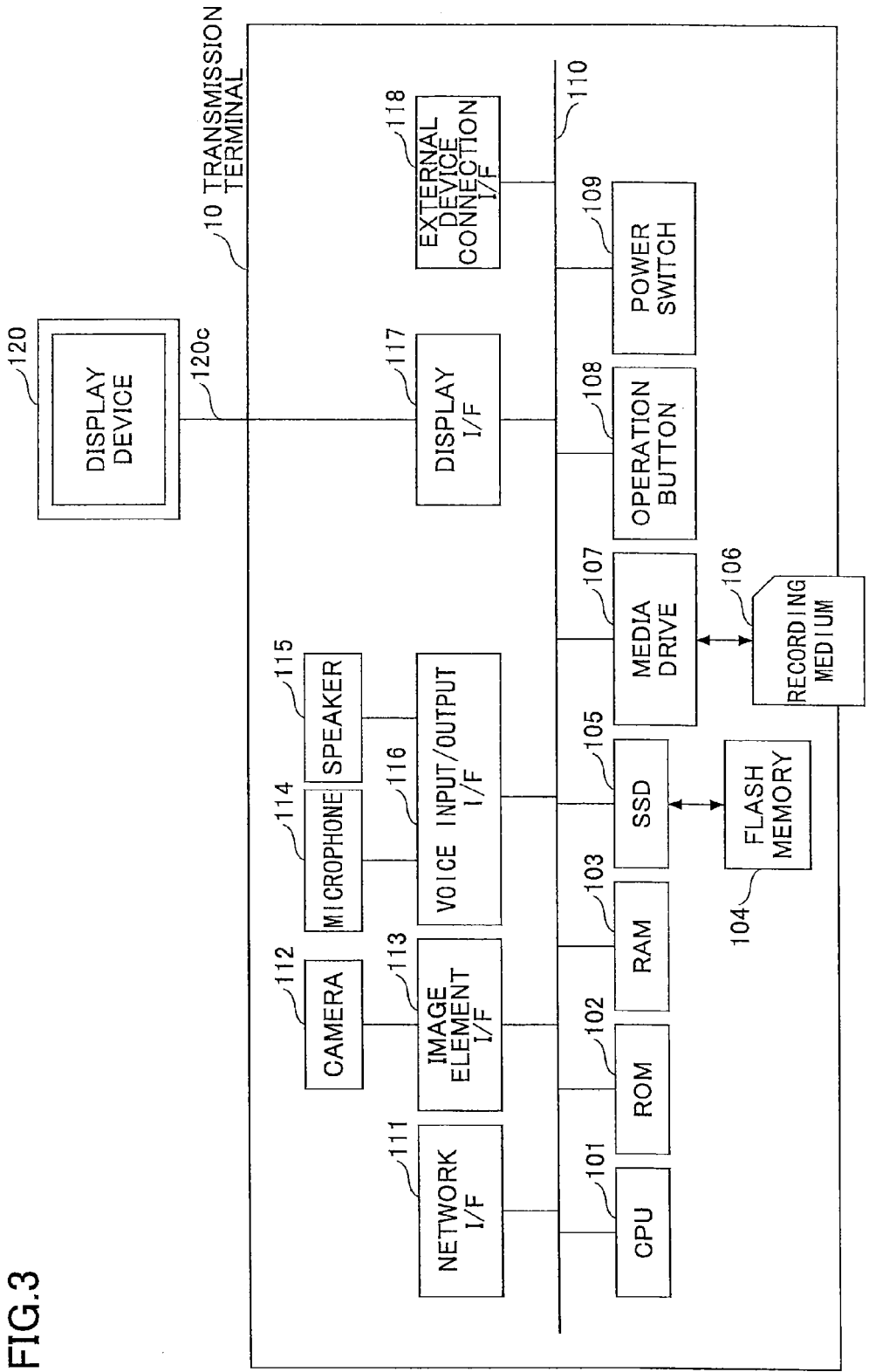
FIG. 3 is a diagram illustrating an example of a hardware configuration of a terminal according to the present exemplary embodiment.

FIG. 3 is a diagram illustrating an example of a hardware configuration of the terminal according to the present exemplary embodiment. As shown in FIG. 3, the terminal 10 includes a CPU (central processing unit) 101, which controls operations of the whole terminal 10; a ROM (read only memory) 102, which stores a program, such as an IPL (initial program loader), used for driving the CPU 101; a RAM (random access memory) 103, used for a work area for the CPU 101; a flash memory 104, storing a program for the terminal and various data, such as image data and voice data; an SSD (solid state drive) 105, which controls reading from and writing into the flash memory 104 the various data according to the control by the CPU 101; a media drive 107, which controls reading data from and writing (storing) data into a recording medium 106, such as a flash memory; an operation button 108, which is operated when switching a destination of the terminal 10, or the like; a power switch 109, used for turning on or off the terminal 10; and a network I/F (interface) 111 for transmitting data using the communication network 2.

Moreover, the terminal 10 further includes a built-in camera 112, for acquiring image data by taking a picture of an object according to control by the CPU 101; an image element I/F 113, which controls the driving of the camera 112; a built-in microphone 114 for inputting voice (sound); a built-in speaker 115 for outputting voice; a voice input/output I/F 116, which performs inputting/outputting processing for a voice signal between the microphone 114 and the speaker 115 according to the control by the CPU 101; a display I/F 117, which transmits image data to an external display device 120 according to the control by the CPU 101; an external device connection I/F 118, for connecting various external devices; and a bus line 110, such as an address bus or a data bus, which electrically connects the above components, as shown in FIG. 3.

The display device 120 includes a display unit, formed of liquid crystal or organic EL (electro luminescence), which displays an image of the object or an icon image for operation. Moreover, the display device 120 is connected to the display I/F 117 via a cable 120c. The cable 120c may be a cable for an analog RGB (VGA) signal, a cable for a component video, a cable for the HDMI (High-Definition Multimedia Interface), or a cable for DVI (Digital Video Interactive) signal.

The camera 112 includes a lens and a solid image element, which convert light into an electric signal to obtain digital data for an image (picture) of an object. For the solid image element, for example, CMOS (complementary metal oxide semiconductor), CCD (charge coupled device), or the like is used.

To the external device connection I/F 118, an external device, such as an external camera, an external microphone, or an external speaker, can be connected via a USB (universal serial bus) cable, or the like. In the case of connecting the external camera, according to the control by the CPU 101, the external camera is driven in priority to the built-in camera 112. In the same way, in the case of connecting the external microphone, according to the control by the CPU 101, the external microphone is driven in priority to the built-in microphone 114. In the case of connecting the external speaker, according to the control by the CPU 101, the external speaker is driven in priority to the built-in speaker 115.

The recording medium 106 is detachable from the terminal 10. Moreover, if the recording medium 106 is a non-volatile memory, from which data is read, or into which data is written according to the control by the CPU 101, not only the flash memory 104, but also EEPROM (electrically erasable and programmable ROM) may be used.

Furthermore, the program for the terminal may be distributed as a file in an installable form or in an executable form stored in a recording medium readable by a computer, such as the recording medium 106. Moreover, the program for the terminal may be stored in the ROM 102, other than the flash memory 104.

The terminal 10, shown in FIG. 3, is an example, and the configuration is not limited to FIG. 3. The display device 120 may be built-in. Each of the camera 112, the microphone 114, and the speaker 115 may be an external device. The terminal 10 may be, for example, a general-purpose PC (personal computer), a smartphone, a tablet terminal, or a mobile phone.

Figure 4:
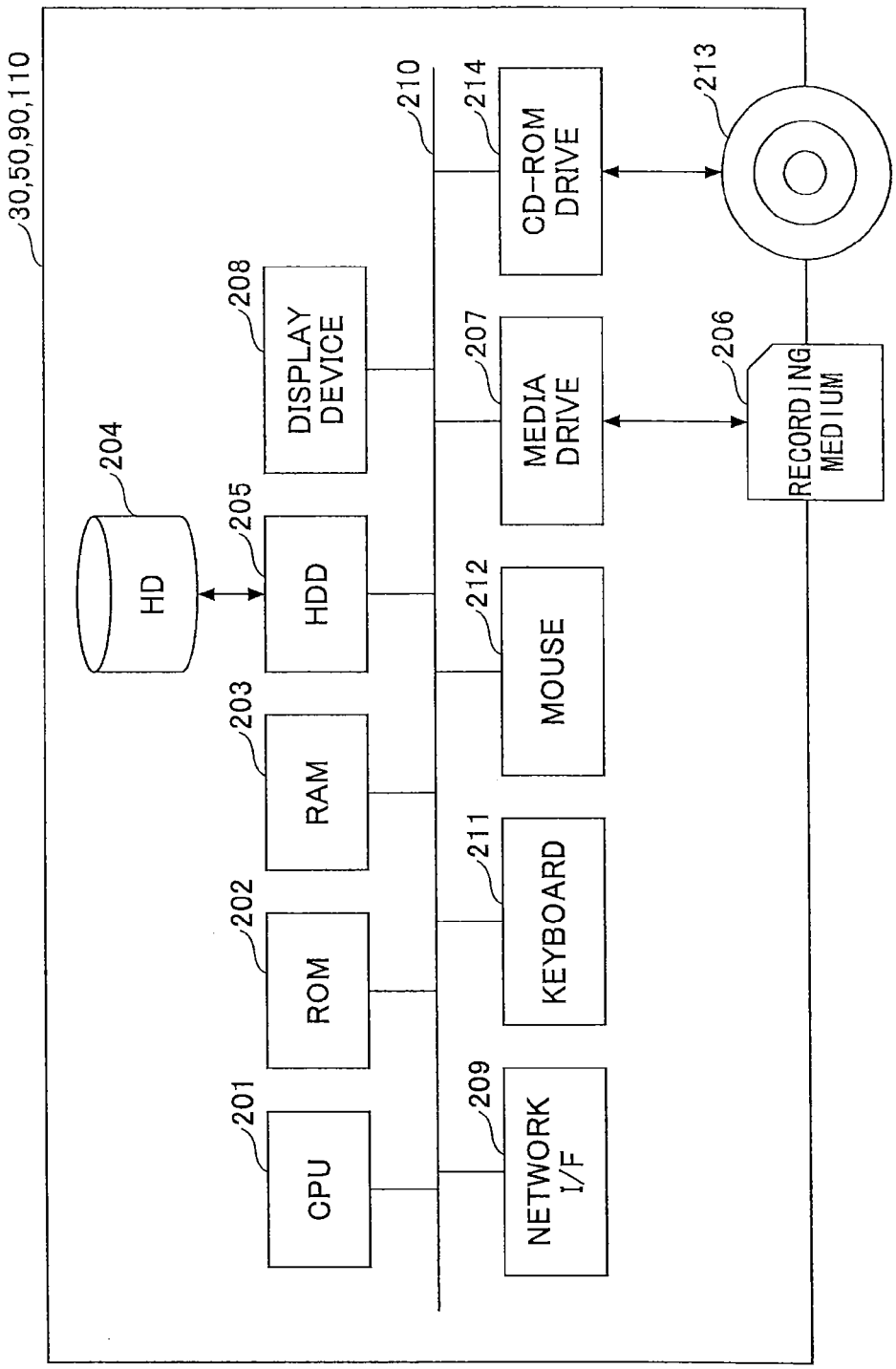
FIG. 4 is a diagram illustrating an example of a hardware configuration of a management apparatus according to the present exemplary embodiment.

FIG. 4 is a diagram illustrating an example of a hardware configuration of the management apparatus according to the present exemplary embodiment. The management apparatus 50 includes a CPU 201, which controls operations of the whole management apparatus 50; a ROM 202, which stores a program such as the IPL used for driving the CPU 201, a RAM 203, used for a work area for the CPU 201; a HD (hard disk) 204, which stores various data, such as a program for transmission management; the HDD (hard disk drive) 205, which controls reading data from and writing data into the HD 204 according to control by the CPU 201; a media drive 207, which controls reading data from and writing (storing) data into a recording medium 206, such as a flash memory; a display unit 208 for displaying various information items, such as a cursor, a menu, a window, a character or an image; a network I/F 209 for transmitting data using the communication network 2; a keyboard 211 equipped with plural keys for inputting characters, numerical values, various instructions or the like; a mouse 212 for performing selection and execution of various instructions, selection of a processing object, a cursor movement, or the like; a CD-ROM drive 214, which controls reading various data from and writing various data into a CD-ROM (compact disc read only memory) 213, as an example of a detachable recording medium; and a bus line 210, such as an address bus or a data bus, which electrically connects the above components, as shown in FIG. 4.

The program for the transmission management may be distributed as a file in an installable form or in an executable form stored in a recording medium readable by a computer, such as the recording medium 206, the CD-ROM 213 or the like. The program for the transmission management may be stored in the ROM 202, other than the HD 204.

Moreover, since the relay device 30 has the same hardware configuration as the above-described management apparatus 50, an explanation will be omitted. However, a program for the relay device for controlling the relay device 30 is stored in the HDD 204. Also in this case, the program for the relay device may be distributed as a file in an installable form or in an executable form stored in a recording medium readable by a computer, such as the recording medium 206, the CD-ROM 213 or the like. The program for the relay device may be stored in the ROM 202, other than the HD 204.

Furthermore, since the program provision apparatus 90 and the maintenance apparatus 100 have the same hardware configuration as the above-described management apparatus 50, an explanation will be omitted. However, a program for controlling the program provision apparatus 90 is stored in the HDD 204. Also in this case, the program for controlling may be distributed as a file in an installable form or in an executable form stored in a recording medium readable by a computer, such as the recording medium 206, the CD-ROM 213 or the like. The program for controlling may be stored in the ROM 202, other than the HD 204.

As the other example of the detachable recording medium, the program may be distributed as a file stored in a recording medium readable by a computer, such as a CD-R (compact disc recordable), a DVD (digital versatile disk), a Blu-ray disc, or the like.

[Function]

Next, a functional configuration of the transmission system according to the present exemplary embodiment will be explained in the following.

Figure 5:
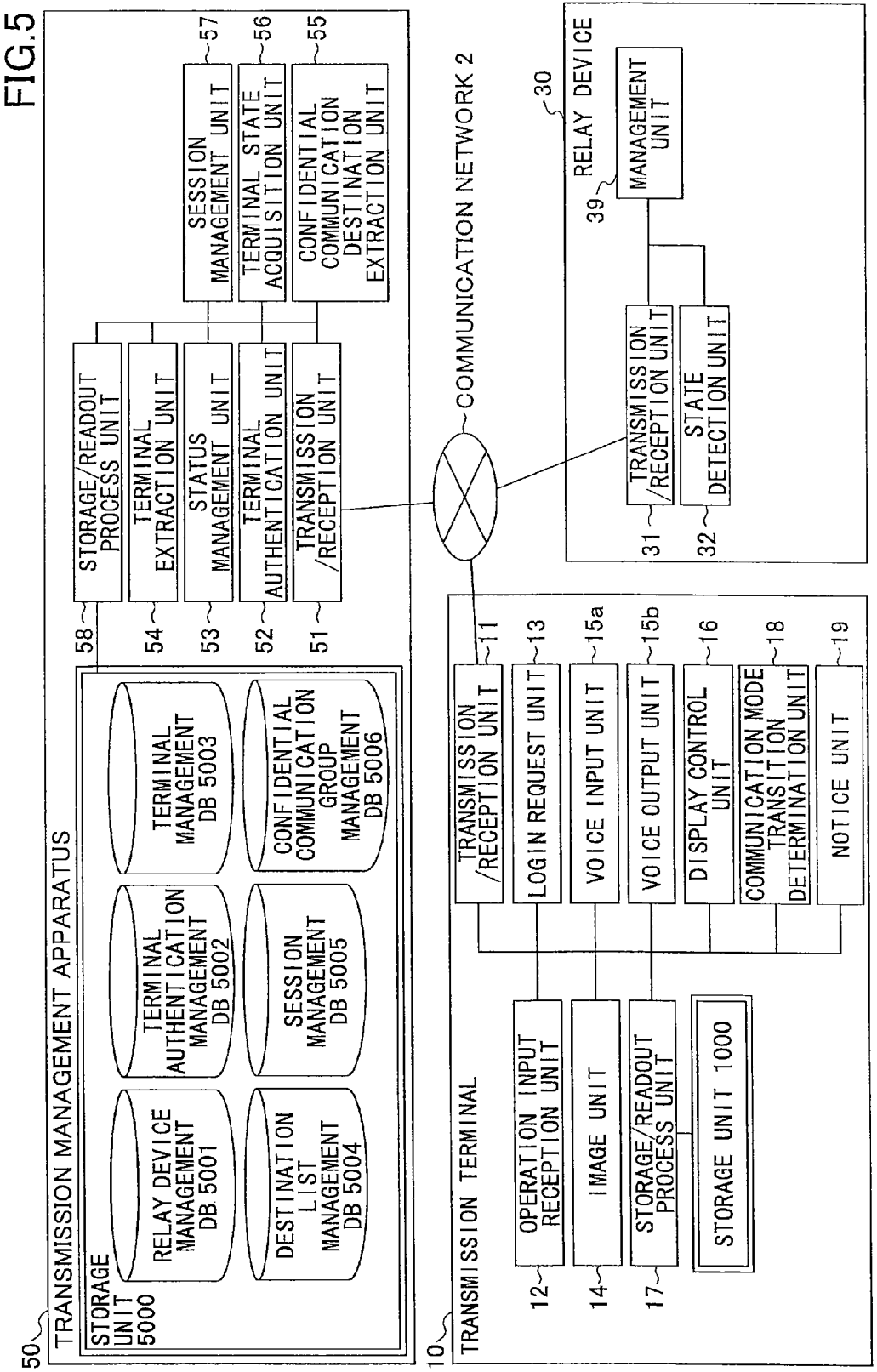
FIG. 5 is a functional block diagram illustrating an example of a terminal, an apparatus and a system in the transmission system according to the present exemplary embodiment.

FIG. 5 is a functional block diagram illustrating an example of the transmission system according to the present exemplary embodiment. The transmission system 1 includes the terminal 10, the relay device 30 and the management apparatus 50, which are connected so as to perform data communications via the communication network 2. Moreover, the program provision apparatus 90, shown in FIG. 1, is not relevant to the communication for the TV conference directly, and is omitted in FIG. 5.

(Transmission Terminal)

The functional configuration of the transmission terminal 10 according to the exemplary embodiment will be described in the following.

The terminal 10 includes a transmission/reception unit 11; an operation input reception unit 12; a login request unit 13, an image unit 14, a voice input unit 15*a*, a voice output unit 15*b*, a display control unit 16, a storage/readout process unit 17, a communication mode transition determination unit 18, and a notice unit 19. Each of the above units is a function or a functioning means realized by one of the components, shown in FIG. 3, operating according to an instruction from the CPU 101 following the program for the terminal 10, which has been copied from the flash memory 104 onto the RAM 103. Moreover, the terminal 10 includes a storage unit 1000, including the RAM 103 and the flash memory 104, shown in FIG. 3.

Next, each of the functional elements of the terminal 10 will be explained in detail with reference to FIGS. 3 and 5. In the following, in the explanation of the functional element of the terminal 10, shown in FIG. 5, a relationship between the functional element and the component, shown in FIG. 3, which realizes the functional element of the terminal 10, will be described.

The transmission/reception unit 11 is realized by the instruction from the CPU 101 and the network I/F 111, shown in FIG. 3, and sends various data (or information) to and receives various data (or information) from other terminals, other apparatuses, or other systems, via the communication network 2. The transmission/reception unit 11 starts receiving, before starting communicating with an intended destination terminal 10, status information indicating a status of each of the terminals 10 as candidates of destination, from the management apparatus 50. The status information indicates not only operating status (online state or offline state) of the terminal 10, but also detailed information, such as, even in the online state, whether calling is possible, whether it is busy, whether a user is leaving her/his seat, or the like. The status information may indicate not only the operational status of the terminal 10 but also information of the status around the terminal, such that the cable 120c is taken off from the terminal 10, an image is not output while a voice signal is output, voice sound is muted, or the like. In the following, an example where the status information indicates the operational status will be described.

The operation input reception unit 12 is realized by the instruction from the CPU 101, the operation button 108 and the power switch 109, shown in FIG. 3, and receives various inputs from a user. For example, when the user turns the power switch 109 to "ON", the operation input reception unit 12 receives a signal of the user's operation, and turns on the power.

The login request unit 13 is realized by the instruction from the CPU 101, shown in FIG. 3, and when receiving the operation for turning on the power, sends login request information for requiring a login and an IP address of the source terminal at the time of sending, from the transmission/reception unit 11, to the management apparatus 50, via the communication network 2. The login request unit 13 may send the login request information when receiving an operational instruction for the terminal 10 from the user. Moreover, when the user turns the power switch from "ON" to "OFF", the transmission/reception unit 11 sends status information to turn off the power to the management apparatus 50, and then the operation input reception unit 12 turns off the power completely. Accordingly, the management apparatus 50 can recognize that the power of the terminal 10 has been turned from "ON" to "OFF".

The image unit 14 is realized by the instruction from the CPU 101, the camera 112 and the image element 113, shown in FIG. 3, and outputs image data of an object obtained by taking a picture of the object.

The voice input unit 15a is realized by the instruction from the CPU 101 and the voice input/output I/F 116, shown in FIG. 3, and inputs voice data obtained by converting a voice of a user into an electric signal at the microphone 114.

The voice output unit 15b is realized by the instruction from the CPU 101 and the voice input/output I/F 115, shown in FIG. 3, and outputs a signal regarding the voice data to the speaker, and output a sound from the speaker.

The display control unit 16 is realized by the instruction from the CPU 101 and the display I/F 117, shown in FIG. 3, and controls a process of transmitting image data to the display device 120. Moreover, the display control unit 16 may send to the display device 120 information on a destination list received from the management apparatus 50, and display the destination list on the display device 120.

A process of the storage/readout process unit 17 is executed by the instruction from the CPU 101 and the SSD 105, shown in FIG. 3, or the storage/readout process unit 17 is realized by the instruction from the CPU 101, stores various data into the storage unit 1000, and reads out various data stored in the storage unit 1000. The storage unit 1000 stores a terminal ID (identification) for identifying the terminal 10, or a user of the terminal 10, a password, and the like. Furthermore, the storage unit 1000 stores image data and voice data received in the communication with the destination terminal, while overwriting the previously stored data. Image data in the previously stored data, to be overwritten, are output from the display device 120, and voice data in the previously stored data are output from the speaker 115.

The communication mode transition determination unit determines a transition of the communication mode based on a volume level (value of volume level) of voice data from the voice inputted by the microphone 114, shown in FIG. 3. The communication mode is, for example, "normal communication mode", "interim confidential communication mode", "confidential communication mode", or the like, which are explained later.

The notice unit 19 gives notice of a present status of the communication mode. As described above, since the communication mode may be transitioned, the terminal 10 is required to notify the user of the present communication mode. Specifically, the display device 120, shown in FIG. 3, may notify the user of the present communication mode, or a lamp of the terminal 10 (not shown) may give notice of the present communication mode.

The terminal ID and relay device ID, which will be explained later, according to the present exemplary embodiment, are identification information, such as a language, a character, a symbol, various signs, or the like, used for uniquely identifying a terminal 10 or a user of the terminal 10 and a relay device 30, respectively. Moreover, the terminal ID and relay device ID may be a combination of at least two of the language, the character, the symbol, and the various signs.

(Relay Device)

Next, a functional configuration of the relay device 30 will be explained.

The relay device 30 includes a transmission/reception unit 31, and a state detection unit 32. Each of the above units is a function or a functioning means realized by one of the components, shown in FIG. 4, operating according to an instruction from the CPU 201 following the program for the relay device, which has been copied from the HD 204 onto the RAM 203.

The transmission/reception unit 31 is realized by the instruction from the CPU 201 and the network I/F 209, shown in FIG. 4, and sends various data (or information) to and receives various data (or information) from other terminals, other apparatuses or other systems, via the communication network 2. Moreover, the transmission/reception unit 31 relays (transfers) image data and voice data sent/received between terminals 10. Especially, in the "confidential communication mode", image data and voice data are relayed (transferred) only to the specified terminal 10, which will be explained later.

The state detection unit 32 is realized by the instruction from the CPU 201, and detects the operational status of the relay device 30, having the state detection unit 32. The operational status is, for example, "online", "offline", "busy" or "halt".

(Management Apparatus)

The management apparatus 50 according to the present exemplary embodiment includes a transmission/reception unit 51, a terminal authentication unit 52, a status management unit 53, a terminal extraction unit 54, a confidential communication destination extraction unit 55, a terminal state acquisition unit 56, a session management unit 57, and a storage/readout process unit 58. Each of the above units is a function or a functioning means realized by one of the components, shown in FIG. 4, operating according to an instruction from the CPU 201 following the program for the management apparatus 50, which has been copied from the HD 204 onto the RAM 203. Moreover, the management unit 50 includes a storage unit 5000, and the HD 204 shown in FIG. 4.

Figure 6:
FIG. 6 is a diagram illustrating an example of a table for managing a relay device according to the present exemplary embodiment.

The storage unit 5000 includes a relay device management DB (database) 5001, including a relay device management table, as shown in FIG. 6. The relay device management table manages an operational status of the relay device 30, a reception time when the management apparatus 50 receives status information indicating the operational status, and an IP address of the relay device 30, associated with each other, for each relay device ID of the relay device 30. For example, the relay device management table, shown in FIG. 6, indicates that the relay device 30*a*, with the relay device ID "111a", is in the operational status "online", the status information is received by the management apparatus 50 on "Nov. 10, 2009, 13:00" and IP address of the relay device 30*a* is "1.2.1.2".

Figure 7:
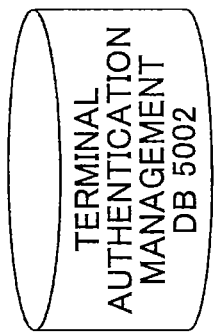
FIG. 7 is a diagram illustrating an example of a table for managing authentication for the terminal according to the present exemplary embodiment.

Furthermore, the storage unit 5000 includes a terminal authentication managing database (DB) 5002, including a terminal authentication management table, as shown in FIG. 7. In the terminal authentication management table, each terminal ID of all the terminals managed by the management apparatus 50 is managed associated with a password for the terminal ID. For example, the terminal authentication management table, as shown in FIG. 7, indicates that a terminal ID of the terminal 10*aa* is "01aa" and a password is "aaaa".

Moreover, the storage unit 5000 includes a terminal managing database (DB) 5003, including a terminal management table, as shown in FIG. 8. The terminal management table manages, for each terminal ID of the terminals 10, a destination name when the terminal 10 is the destination, an operational status of the terminal 10, a reception time when the management apparatus 50 receives login request information (described later), and an IP address of the terminal 10, associated with each other. For example, the terminal management table, as shown in FIG. 8, indicates that the terminal 10*aa* with the terminal ID "01aa", has a terminal name "Japan, Tokyo office, AA terminal", the operational status is "online (call is possible)", the management apparatus 50 receives the login request information at "Nov. 10, 2009, 13:40", and the IP address of the terminal 10*aa* is "1.2.1.3".

Moreover, the storage unit 5000 includes a destination list managing database (DB) 5004, including a destination list management table, as shown in FIG. 9. The destination list management table manages request source terminals, which require starting communicating in the TV conference, so that all terminal IDs of destination terminals registered as candidates of a destination terminal are associated with each of the terminal IDs of the request source terminals. The destination list management table also manages, for each of the request source terminals, a destination terminal, which is allowed to receive confidential data issued from the request source terminal in the confidential communications. For example, the destination list management table, shown in FIG. 9, indicates that candidates of a destination terminal 10, which the request source terminal with the terminal ID "01aa" (terminal 10*aa*) requires to start communication in the TV conference, are the terminal 10*ab* with the terminal ID "01ab", the terminal 10*ba* with the terminal ID "01ba", the terminal 10*bb* with the terminal ID "01bb", and the like. Moreover, to the terminal 10*ab* with the terminal ID "01ab" and the terminal 10*ba* with the terminal ID "01ba" among them, a symbol "*" is attached. The symbol "*" indicates that the destination terminal is allowed to receive confidential data issued from the request source terminal 10*aa*. The candidate of the destination terminal and whether the confidential data is allowed to be received or not may be updated by appending or deleting an item in the destination list management table according to a request from an arbitrary source terminal 10 to the management apparatus 50.

Moreover, the storage unit 5000 includes a session managing database (DB) 5005, including a session management table, as shown in FIG. 10. The session management table manages, for each of the session IDs used for executing a session with the relay device 30, a relay device ID of the relay device 30 used for relaying image data and voice data, a terminal ID of the request source terminal 10, a terminal ID of the destination terminal 10, associated with each other. For example, the session management table, shown in FIG. 10, indicates that in the session executed using the session ID "se1", the relay device 30*a* (relay device ID "111a") relays image data and voice data between the request source terminal with the terminal ID "01aa" (terminal 10*aa*) and the destination terminal with the terminal ID "01db" (terminal 10*db*).

Moreover, the storage unit 5000 includes a confidential communication group managing database (DB) 5006, including a confidential communication group management table, as shown in FIG. 11. The confidential communication group management table manages groups of terminals 10, among which confidential communication is allowed. For example, the confidential communication group management table, as shown in FIG. 11, indicates that a group "Gr01", to which terminal IDs "01aa", "01ab", and "01ac" belong, is registered. Confidential communication issued from the terminal with the terminal ID "01aa" is allowed to be received by the terminal with the terminal ID "01ab" and the terminal with the terminal ID "01ac". Moreover, confidential communication issued from the terminal with the terminal ID "01ab" is allowed to be received by the terminal with the terminal ID "01aa" and the terminal with the terminal ID "01ac".

Next, each of the functional elements of the management apparatus 50 will be described in the following.

The transmission/reception unit 51 is executed by the instruction from the CPU 201 and the network I/F 209, shown in FIG. 4, and sends various data (or information) to and receives various data (or information) from the other terminals, other apparatuses, or other systems, via the communication network 2.

The terminal authentication unit 52 is realized by the instruction from the CPU 201, shown in FIG. 4, searches the terminal authentication management DB 5002 in the storage unit 5000 (see FIG. 7) with a terminal ID and a password included in the login request information received via the transmission/reception unit 51 as a search key, and determines whether the same terminal ID and the same password are managed in the terminal authentication management DB 5002, to perform the terminal authentication.

The status management unit 53 is realized by the instruction from the CPU 201, shown in FIG. 4, and, in order to manage the operational status of the request source terminal 10, which requires to login, manages the terminal ID of the request source terminal 10, the operational status of the request source terminal 10, the reception time when the management apparatus 50 receives the login request information, and the IP address of the request source terminal 10, by associating them with each other and by storing them in the terminal management DB 5003 (see FIG. 8). Moreover, the status management unit 53, based on the status information to turn off the power transmitted from the terminal 10, according to the user's turning the power switch 109 of the terminal 10 from "ON" to "OFF", changes the operational status in the terminal management DB 5003 (see FIG. 8) from "online" to "offline".

The terminal extraction unit 54 is realized by the instruction from the CPU 201, shown in FIG. 4, and extracts a terminal ID by searching the destination list management DB 5004 (see FIG. 9) with the terminal ID of the request source terminal 10 which requires to login as a search key, and reads out terminal IDs of candidates of a destination terminal 10 which can communicate with the request source terminal 10. Moreover, the terminal extraction unit 54 searches the destination list management DB 5004 (see FIG. 9) with the terminal ID of the request source terminal 10, which requires to login, as a search key, and searches for terminal IDs of other request source terminals, that are registered candidates of a destination terminal 10 which includes the above request source terminal 10.

The confidential communication destination extraction unit 55 is realized by the instruction from the CPU 201, shown in FIG. 4, searches the destination list management DB 5004 (see FIG. 9) and the confidential communication group management DB 5006 (see FIG. 11), with the terminal ID of the request source terminal 10, and extracts terminal IDs of terminals, which are allowed to perform confidential communications with the request source terminal 10.

The terminal state acquisition unit 56 that is realized by the instruction from the CPU 201, shown in FIG. 4, searches the terminal management DB 5003 (see FIG. 8), with the terminal ID of the candidate of the destination terminal 10 extracted by the above terminal extraction unit 54 as a search key, and reads out operating status for each of the terminal IDs extracted by the terminal extraction unit 54. Accordingly, the terminal state acquisition unit 56 can acquire the operating status of the candidates of the destination terminal 10, which are allowed to communicate with the request source terminal 10, which is required to login. Moreover, the terminal state acquisition unit 56, with the terminal ID extracted by the terminal extraction unit 54 as a search key, searches the terminal management DB 5003, and acquires also the operational status of the request source terminal 10, which is required to login.

The session management unit 57 is realized by the instruction from the CPU 201, shown in FIG. 4, and manages the generated session ID, the relay device ID of the relay device 30, terminal ID of the request source terminal 10 and terminal ID of the destination terminal 10, by associating them with each other, and storing them in the session management DB 5005 of the storage unit 5000 (see FIG. 10).

The storage/readout process unit 58 is executed by the instruction from the CPU 201, and the HDD 205, shown in FIG. 4, and performs a process of storing various data into the storage unit 5000 and a process of reading out various data stored in the storage unit 5000.

[Process in the Transmission System]

Next, the method of processing in the transmission system according to the present exemplary embodiment will be described as follows.

(Managing Process in Relay Device 30)

Figure 12:
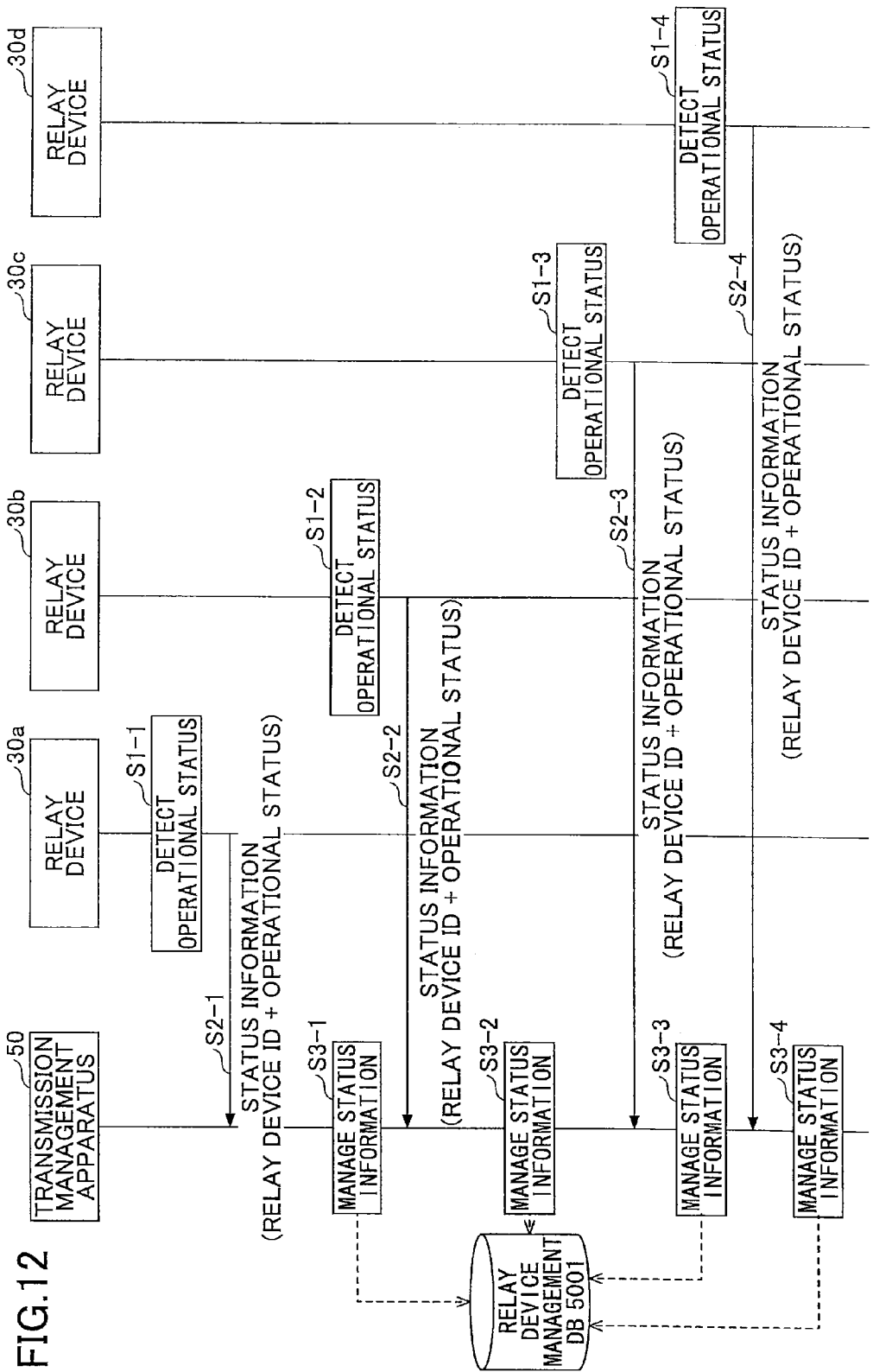
FIG. 12 is a sequence diagram illustrating an example of a process of managing status information indicating a state of the relay device, transmitted from the relay device to the management apparatus according to the present exemplary embodiment.

FIG. 12 is a sequence diagram illustrating an example of the process of managing the status information, which indicates a state of the relay device 30, transmitted from the relay device 30 to the management apparatus 50, according to the present exemplary embodiment. The process of managing the status information indicating the state of the relay device 30 transmitted from the relay device 30 to the management apparatus 50 will be explained, with reference to FIG. 12.

In each of the relay devices 30, the state detection unit 32, as shown in FIG. 5, periodically detects the operational status of the relay device 30 (steps S1-1, S1-2, S1-3 and S1-4). In order to manage the operational status in real time on the side of the management apparatus 50, the transmission/reception unit 31 of the relay device 30 periodically sends the status information to the management apparatus 50 via the communication network (steps S2-1, S2-2, S2-3 and S2-4). The status information includes the relay device ID of the relay device 30, and the operational status detected by the state detection unit 32 of the relay device 30 with the relay device ID.

In the present exemplary embodiment, the relay devices (30*a*, 30*b*, 30*d*) operate normally and are in a state of "online", whereas the relay device 30*c* is in a state of "offline", though the relay device 30*c* operates, but has a problem in the program for executing the relaying operation of the relay device 30*c*.

Next, in the management apparatus 50, the transmission/reception unit 51 receives the status information transmitted from each of the relay devices 30. The storage/readout process unit 58 stores the status information in the relay device management DB 5001 (see FIG. 6) of the storage unit 5000, and manages the status information for each relay device ID (steps S3-1, S3-2, S3-3 and S3-4). Accordingly, for the operational statuses of the relay devices 30, as shown in the table of FIG. 6, any of the statuses "online", "offline" and "out of order", are managed for the respective relay device IDs. Moreover, the reception time when the management apparatus 50 receives the status information is also stored and managed for each relay device ID.

In the case that status information is not sent from the relay device 30, in the relay device management table, shown in FIG. 6, a field of the operational status and a field of the reception time in each record will be blank, or indicate the operational status and the reception time of the status information, received previously.

(Process in the Preparation Stage Before Starting the Communication)

Figure 13:
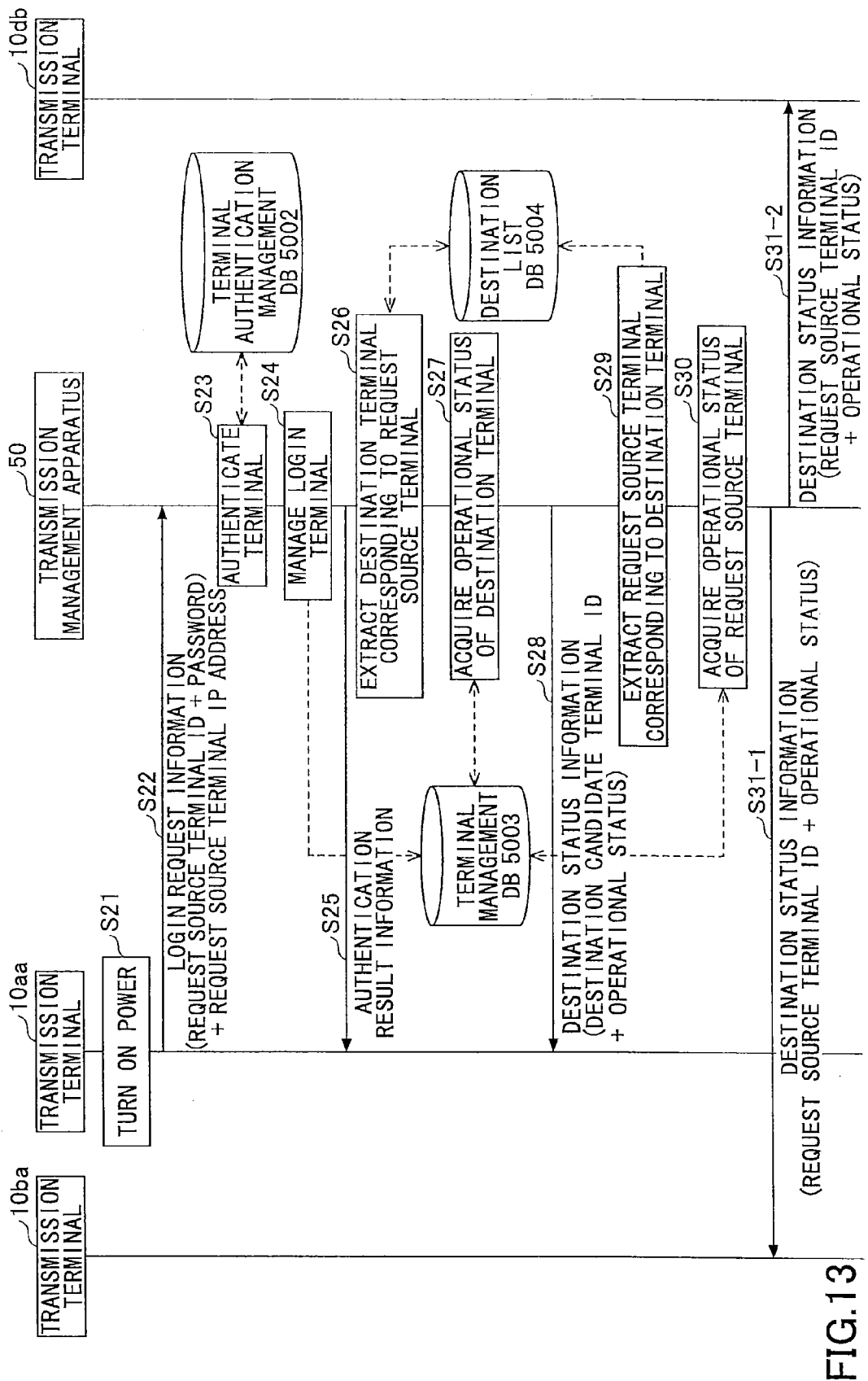
FIG. 13 is a sequence diagram illustrating an example of a process in a stage of preparing for starting communications between plural terminals according to the present exemplary embodiment.

FIG. 13 is a sequence diagram illustrating an example of the process in the preliminary stage for starting the communications between the plural terminals 10. With reference to FIG. 13, the sending and receiving processes for respective management information items in the preliminary stage before starting the communications will be described in the following. In FIG. 13, all the processes for sending/receiving the management information are performed at the session for management data "sei", shown in FIG. 2.

At first, when the user turns on the power switch 109, shown in FIG. 3, the operation input reception unit 12, shown in FIG. 5, receives the user's operation, and the power turns ON (step S21). The login request unit 13, when receiving the operation for turning on the power, automatically sends login request information, indicating a login request, to the management apparatus 50 from the transmission/reception unit 11 via the communication network 2 (step S22). As described above, the login request information may be sent not only when receiving the operation for turning on the power, but also when receiving the instruction for a user's operation for the terminal 10. The login request information includes the terminal ID for identifying the terminal 10*aa* (or the user of the terminal 10*aa*) as the request source terminal and the password. The terminal ID and the password have been read out from the storage unit 1000 via the storage/readout process unit 17 and have been transmitted to the transmission/reception unit 11. The terminal ID and the password may be inputted to the terminal 10 by the user, not the ones read out from the storage unit 1000. Moreover, when the login request information is sent from the terminal 10*aa* to the management apparatus 50, the management apparatus 50 on the reception side can recognize the IP address of the terminal 10*aa* on the transmission side.

Next, the terminal authentication unit 52 of the management apparatus 50 searches the terminal authentication management DB 5002 (see FIG. 7) with the terminal ID and the password included in the login request information received via the transmission/reception unit 51 as a search key, and performs a terminal authentication by determining whether the same terminal ID and the password are managed in the terminal authentication management DB 5002 or not (step S23). When the terminal authentication unit 52 determines that the login request information is from the terminal 10, which has an authorized right for use, since the terminal authentication unit 52 manages the same terminal ID and the same password, the status management unit 53 stores into the terminal management DB 5003 (see FIG. 8) the terminal ID, an operational status, a reception time when the login request information is received, and the IP address of the terminal 10*aa*, associated with each other (Step S24). Accordingly, the terminal management table, shown in FIG. 8, manages the operational status "online", the reception time "1009.11.10.13:40", and the IP address of the terminal 10*aa* "1.2.1.3", associated with the terminal ID "01aa".

Moreover, the transmission/reception unit 51 of the management apparatus 50 sends authentication result information, indicating a result of the authentication obtained by the terminal authentication unit 52, via the communication network 2, to the request source terminal (terminal 10*aa*), which has required the login (step S25). Further, a process when the terminal authentication unit determines the request terminal has the authorized right for use will be explained as follows in the present exemplary embodiment.

The terminal extraction unit 54 of the management apparatus 50 searches the destination list management DB 5004 (see FIG. 9) with the terminal ID "01aa" of the request source terminal 10*aa*, which has required the login, as a search key, and extracts the terminal ID of a candidate of a destination terminal 10, which can communicate with the request source terminal (terminal 10*aa*) by reading out from the destination list management DB 5004 (step S26). In the present exemplary embodiment, the terminal ID of the destination terminals 10 corresponding to the terminal ID "01aa" of the request source terminal (terminal 10*aa*), are extracted (for example, "01ab", "01ba", "01bb", "01ca", "01cb", "01da", "01db", or the like).

Next the terminal state acquisition unit 56 searches the terminal management DB 5003 (see FIG. 8) with the terminal IDs of the candidates of the destination terminal 10, extracted by the terminal extraction unit 54 (for example, "01ab", "01ba", "01bb", "01ca", "01cb", "01da", "01db", or the like) as a search key, and acquires, by reading out an operational status ("offline" or "online") for each terminal ID, extracted by the terminal extraction unit 54, the operational status of each of the destination terminals 10 (step S27).

Next, the transmission/reception unit 51 sends destination status information including the terminal ID used as the search key at step S27 (for example, "01ab", "01ba", "01bb", "01ca", "01cb", "01da" and "01db"), and the operational status ("offline" or "online") of the terminal 10 corresponding to each of the terminal IDs (terminal 10*ab*, 10*ba*, 10*ca*, 10*db*, 10*da* and 10*db*), to the request source terminal (terminal 10*aa*), via the communication network 2 (step S28). Accordingly, the request source terminal (terminal 10*aa*) can recognize the operational status at present of each of terminals 10 as the candidates of the destination terminal 10, which can communicate with the request source terminal (terminal 10*aa*).

Furthermore, the terminal extraction unit 54 of the management apparatus 50 searches the destination list management DB 5004 (see FIG. 9) with the terminal ID "01aa" of the request source terminal (terminal 10*aa*), which has required the login, as a search key, and extracts terminal IDs of other request source terminals 10, which are registered candidates of a destination terminal 10 which includes the above request source terminal (terminal 10*aa*) with the terminal ID "01aa" (step S29). For example, in the destination list management table, shown in FIG. 9, the terminal IDs of the other request source terminals 10 extracted as above, are "01ab", "01ba", "01ca", "01cb", "01da", "01db", and the like.

Next the terminal state acquisition unit 56 of the management apparatus 50, searches the terminal management DB 5003 (see FIG. 8), with the terminal ID "01aa" of the request source terminal (terminal 10*aa*), which required the login, as a search key, and acquires the operational status of the request source terminal (terminal 10*aa*), which required the login (step S30).

Furthermore, the transmission/reception unit 51 sends, to the terminals 10*ba*, 10*bb* 10*cb*, 10*da* and 10*db* with the operational status of "online", in the terminal management DB 5003 (see FIG. 8), out of the terminals related to the terminal ID, extracted at step S29, destination status information including the terminal ID "01aa" of the request source terminal (terminal 10*aa*) acquired at step S30 and the operational status of "online" (Steps S31-1 and S31-2). When the transmission/reception unit 51 sends the destination status information to the terminals 10, based on the terminal IDs ("01ba" or "01db"), the transmission/reception unit 51 refers the IP address of the terminals 10 managed in the terminal management table, shown in FIG. 8. Accordingly, to each of the other destination terminals 10, which can communicate with the request source terminal (terminal 10*aa*) having required the login as a destination, the terminal ID "01aa" of the request source terminal (terminal 10*aa*), which required the login, and the operational status of "online" can be transferred.

On the other hand, in the other terminal 10, as in step S21, when the user turns on the power switch 109, shown in FIG. 4, the operation input reception unit 12, shown in FIG. 5, receives the user's operation, and the power turns ON. Since the same processes as in steps S22 to S31-1, and S31-2 are performed, the explanation is omitted.

(Session Establish Process)

Figure 14:
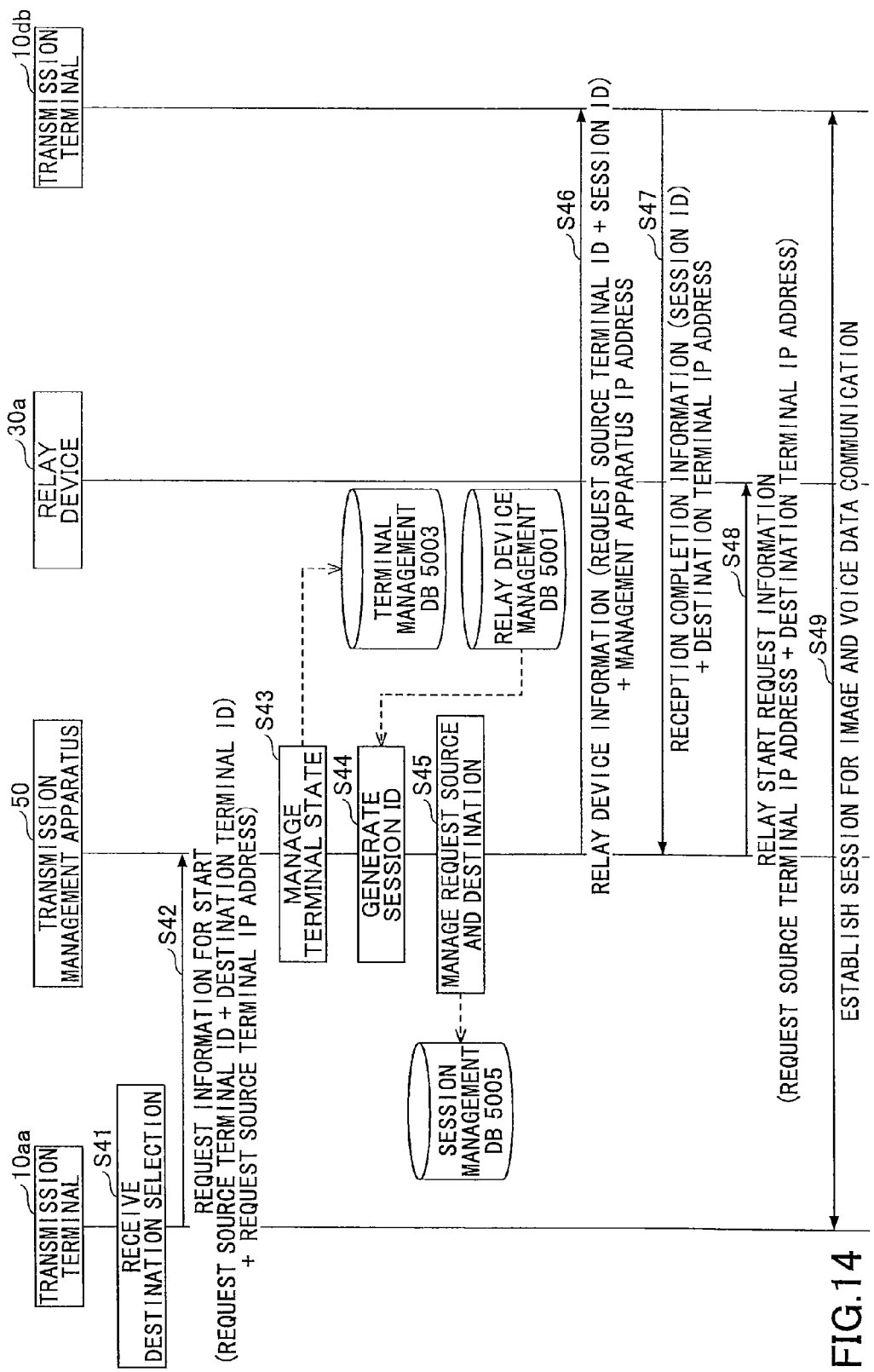
FIG. 14 is a sequence diagram illustrating an example of a process of establishing a session for sending/receiving image data and voice data between the terminals according to the present exemplary embodiment.

FIG. 14 is a sequence diagram illustrating an example of processing of establishing a session of sending/receiving image data and voice data between terminals 10. With reference to FIG. 14, the process of establishing the session of sending/receiving the image data and the voice data between the terminals 10 will be explained in the following. In FIG. 14, all the processes for sending/receiving the management information are performed at the session for the management information "sei", as shown in session "sei". Moreover, in the present exemplary embodiment, the request source terminal (terminal 10*aa*) can communicate with at least one of the terminals 10 with the operational status of "online" (for example, terminals 10*ba* and 10*db*), according to the status information, out of the terminals 10 as the candidates of the destination terminal 10. Accordingly, in the following, further processes in the case where the user of the request source terminal (terminal 10*aa*) selects to communicate with the destination terminal (terminal 10*db*) will be explained.

At first, the user selects the terminal 10*db* by depressing the operation button 108 to select the terminal 10*db*, then the operation input reception unit 12, shown in FIG. 5, receives a request to start communicating with the destination terminal (terminal 10*db*) (step S41). The transmission/reception unit 11 of the request source terminal (terminal 10*aa*) sends start request information, including the terminal ID "01aa" of the terminal 10*aa* and the terminal ID "01db" of the destination terminal 10*db* and indicating that starting the communication is required, to the management apparatus 50 (step S42). Accordingly, the transmission/reception unit 51 of the management apparatus 50 receives the start request information and can recognize the IP address "1.2.1.3" of the request source terminal (terminal 10*aa*) as a transmission source.

The status management 53, based on the terminal ID "01aa" of the request source terminal (terminal 10*aa*) and the terminal ID "01db" of the destination terminal (terminal 10*db*), included in the start request information, in the terminal management table of the terminal management DB 5003 (see FIG. 8), changes both of the fields of the operational status in the records, each including the terminal ID "01aa" or the terminal ID "01db", to "during transmission (busy)" (step S43). In this stage, although both the request source terminal (terminal 10*aa*) and the destination terminal (terminal 10*db*) have not yet started communicating with each other, both terminals 10 have transitioned to the busy state. When an other terminal 10 tries to communicate with the request source terminal (terminal 10*aa*) or the destination terminal (terminal 10*db*), a sound or a display indicating the busy state is output.

Next, a process to execute the session with the relay device 30 will be explained in the following.

At first, the session management unit 57, in the relay device management table of the relay device management DB 5001 (see FIG. 6), selects one relay device 30 with the operating status of "online", acquires the relay device ID (for example, "111a") of the relay device 30, and generates a session ID used for executing the session with the relay device 30 (step S44). The session management unit 57 stores the session ID "se1" generated at step S44, the relay device ID "111a", the terminal ID of the request source terminal (terminal 10*aa*) and the terminal ID "01db" of the destination terminal (terminal 10*db*), associated with each other, into the session management unit 5005 (see FIG. 10) of the storage unit 5000, and manages them (step S45).

Next, the transmission/reception unit 51, shown in FIG. 5, sends relay device refinement information to the destination terminal (terminal 10*db*) via the communication network 2 (step S46). Relay device information includes the terminal ID "01aa" of the request source terminal (terminal 10*aa*), the session ID "se1", and the IP address of the management apparatus 50. Accordingly, the terminal 10*db*, in executing the session of the session ID "se1", can recognize which terminal 10 issued the request to start communicating and the IP address "1.1.1.2" of the management apparatus 50 as a transmission source of the relay device information.

The terminal 10*db* sends reception completion information, indicating that receiving the relay device information has been completed, from the transmission/reception unit to the management apparatus 50, via the communication network 2 (step S47). The reception completion information includes the session ID "se1". Accordingly, the management apparatus 50 can recognize that transferring a number of a relay device executed in the session ID "se1" has been completed and an IP address "1.3.2.4" of the destination terminal (terminal 10*db*) as a transmission source.

The transmission/reception unit 51 of the management apparatus 50 sends relay start request information, indicating that starting relaying is required, to the relay device 30*a* via the communication network 2 (step S48). The relay start request information includes the IP address "1.2.1.3" of the request source terminal (terminal 10*aa*) and the IP address "1.3.2.4" of the destination terminal (terminal 10*db*), respectively, which are relayed. Accordingly, the relay device 30*a* recognizes that the relay device 30*a* operates as the relay device, and establishes a session for sending/receiving three image data sets (low resolution, intermediate resolution and high resolution) and voice data between the terminals (10*aa* and 10*db*) (step S49). According to the above processes, the terminals (10*aa* and 10*db*) can start communicating in a TV conference.

[Process to Transition to Confidential Communication Mode]

Next, a process of transitioning to the "confidential communication mode" and a state of transmission of video data in each status will be described in the following. The communication mode means a mode to determine to which terminal 10 image data and voice data are sent. The kinds of the communication mode are, for example, "normal communication mode", "confidential communication mode" and "interim confidential communication mode".

The "normal communication mode" is a mode where image data or voice data are transferred to all the terminals 10, which participate in the conference. Just after the conference starts, all the terminals 10 are in the "normal communication mode". Moreover, the "confidential communication mode" is a mode where image data or voice data are transferred only to the terminal registered in advance in the destination list management table (see FIG. 9) or in the confidential communication group management table (see FIG. 11). Furthermore, "interim confidential communication mode" is a temporary mode until transitioned to the "confidential communication mode".

(Process of Transitioning to Confidential Communication Mode)

Figure 15:
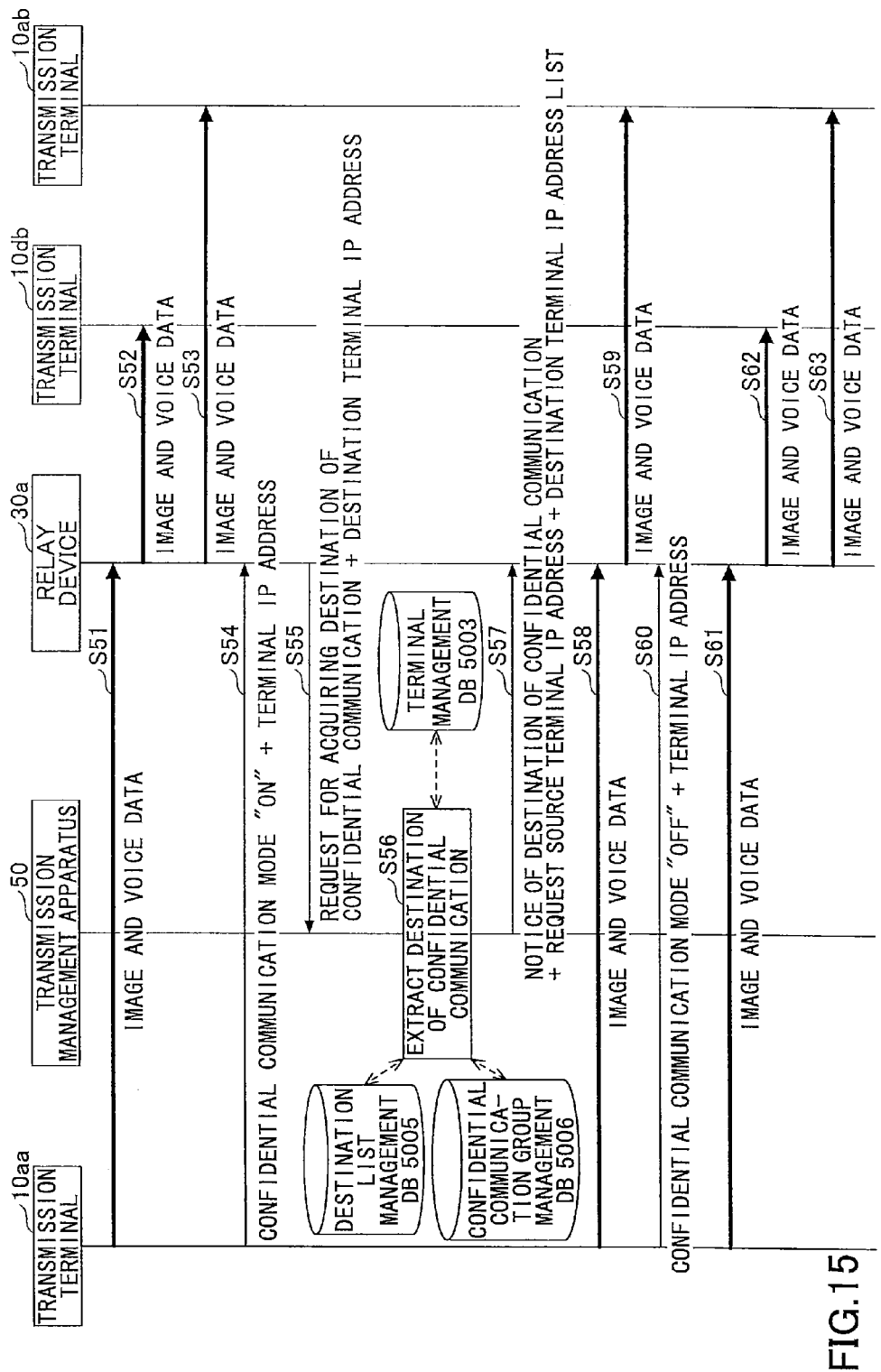
FIG. 15 is a sequence diagram illustrating an example of a process of transitioning to a confidential communication mode according to the present exemplary embodiment.

FIG. 15 is a sequence diagram illustrating an example of a process of transitioning to the "confidential communication mode". In FIG. 15, the terminals 10*aa*, 10*db* and 10*ab* participate in the same conference according to the above-described method. The process of these terminals will be explained in the following.

At first, when all the terminals operate in the "normal communication mode", i.e. none of the terminals performs the confidential communication, image data and voice data sent from the terminal 10*aa* (step S51) are transferred to all the other terminals 10*db* and 10*ab*, which participate in the conference (steps S52 and S53). Accordingly, users using the terminals 10*db* and 10*ab* can view and listen to the image data and the voice data sent from the terminal 10*aa*.

For example, when the communication mode transition determination unit 18 in the terminal 10*aa* decides to turn on the "confidential communication mode" (the process will be described later in detail), the relay device 30*a* is notified. The terminal 10*aa* notifies the relay device 30*a* of request content and the IP address of the terminal 10*aa* (step S54).

The relay device 30*a* receives the notice from the terminal 10*aa*, and notifies the management apparatus 50 of a request for acquiring a destination of the confidential communication and the IP address of the terminal 10, which is required to transition to the "confidential communication mode".

The confidential communication destination extraction unit 55 of the transmission management unit 50, which received the request, performs the process of extracting a destination of the confidential communication (step S56).

Specifically, at first the confidential communication destination extraction unit 55 searches the terminal management table (see FIG. 8) of the terminal management DB 5003 with the IP address of the request source terminal 10*aa* as a search key, and extracts the terminal ID of the request source terminal 10aa, and later a destination of the confidential communication which is an object to be extracted. In the present exemplary embodiment, based on the IP address (1.2.1.3) of the terminal 10aa, the terminal ID "01aa" is extracted.

Next the confidential communication destination extraction unit 55 searches the destination list management table (see FIG. 9) of the destination list management DB 5004, with the extracted terminal ID as a search key, and extracts a list of terminals, which are allowed to receive the confidential communication from the request source terminal 10aa. In FIG. 9, the terminal ID to which a symbol "*" is attached represents a terminal ID of a terminal which is allowed to receive the confidential communication. Accordingly, for the terminal ID of the request source terminal "01aa", destination terminal IDs "01ab", "01ba", "01cb" and "01db" are extracted as the terminals which are allowed to receive the confidential communication.

Next, the confidential communication destination extraction unit 55 searches the confidential communication group management table (see FIG. 11) of the confidential communication group management DB 5006 with the terminal ID of the request source terminal 10aa as a key, and extracts a group for confidential communication to which the terminal 10aa belongs and a list of terminals which belong to the group of confidential communication. Furthermore, the extracted list of terminals 10 is added to the above result of extraction.

With reference to FIG. 11, the confidential communication group, to which the terminal with the terminal ID "01aa" belongs, has group ID "GR01". Terminal IDs of the terminals 10, which belong to the confidential communication group with the group ID "GR01", are "01aa", "01ab" and "01ac". On the other hand, the terminal IDs of the terminals 10, which are allowed to receive the confidential communication, extracted in the above extracting process, are "01ab", "01ba", "01cb", and "01db". Accordingly, the terminal 10, finally extracted as a confidential communication destination for the request source terminal 10aa, is the terminal 10ab (terminal ID "01ab").

The confidential communication destination extraction unit 55, searches the terminal management table (see FIG. 8) of the terminal management DB 5003 with the terminal ID extracted as the confidential communication destination as a search key, and extracts an IP address of a terminal, an operational status of which is "online", i.e. transmission is possible. The transmission/reception unit 51 sends, as a notice of the confidential communication destination, an IP address list of the destination terminals 10 of the confidential communication including an IP address of the extracted terminal 10, and the IP address of the request source terminal 10aa, to the relay device 30a (step S57).

The transmission/reception unit 31 of the relay device 30a receives the notice of the confidential communication destination, and afterward, performs a data transferring process for communication of image data and voice data from the terminal 10aa in the "confidential communication mode" (IP address of the request source terminal) only to the IP address on the IP address list of the destination terminal 10ab of the confidential communication, reported from the management apparatus 50.

In FIG. 15, when the terminal 10aa (terminal ID 01aa) is the request source terminal, a terminal 10, which is allowed as a destination of the confidential communication, is only the terminal 10ab (terminal ID 01ab). Accordingly, image data and voice data sent from the terminal 10aa (step S58) are transferred only to the terminal 10ab (step S59). Afterward, in the terminal 10aa, when the communication mode transition determination unit 18 decides to turn off the "confidential communication mode", the transition from the "confidential communication mode" is notified to the relay device 30a with the IP address of the request source terminal 10aa (step S60).

The relay device 30a receives the notice from the terminal 10aa, and returns the process regarding image data and voice data sent from the terminal 10aa to the normal state ("normal communication mode"), i.e. the image data and voice data sent from the terminal 10aa are transferred to both the terminal 10db and the terminal 10ab.

(Communication Mode Transition Determining Process)

As described above, the terminal 10aa, when the communication mode transition determination unit 18 determines to turn on the "confidential communication mode", communicates in the confidential communication mode, by notifying the relay device 30a of the transition to the "confidential communication mode" (see step S54 in FIG. 15). In the following, the communication mode transition determining process, i.e. the process of determining ON or OFF for the "confidential communication mode" by the communication mode transition determination unit 18 will be described.

FIG. 16 is an example of a communication mode transition determining table, according to the present exemplary embodiment. In the communication mode transition determining table, as shown in FIG. 16, a method of determining is defined by using terms of "present mode", "transition condition", "destination of transition" and "process". When in the "present mode", the "transition condition" is satisfied, the communication mode transitions to the "destination of transition" and the "process" at the transition is performed. Variables, which appear in the table, are as follows:

V: volume level of a voice sound input from the microphone 114.

Vt1: lower limit threshold to the confidential communication mode transition (first volume level).

Vt2: upper limit threshold to the confidential communication mode transition (second volume level)

Vt3: threshold to the normal communication mode (third volume level)

T1: a duration time used for transition determination from the "interim confidential communication mode" to the "confidential communication mode".

T2: a duration time used for transition determination from the "confidential communication mode" to the "normal communication mode".

Figure 17:
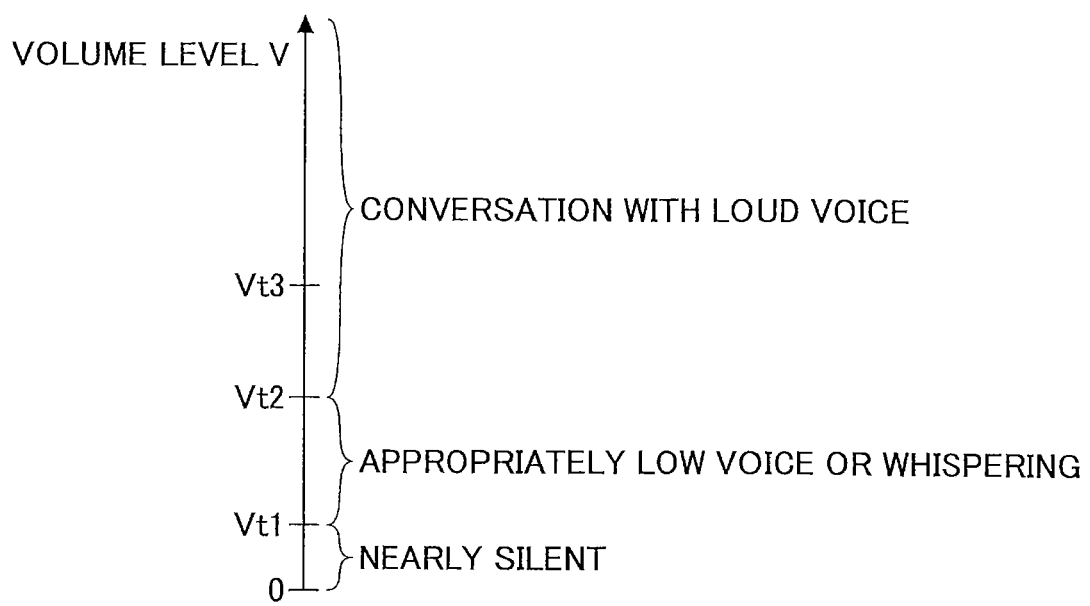
FIG. 17 is a diagram illustrating an example of a relationship between a magnitude of sound and a threshold according to the present exemplary embodiment.

FIG. 17 illustrates an example of a relationship between the volume level V and each of the thresholds. As shown in FIG. 17, the thresholds Vt1 and Vt2 are volume levels which are adjusted and determined according to a volume level of a user's actual voice. In the following, the process of the determining will be explained with reference to FIGS. 16 and 17.

(1) In the Case that the Present Mode is the "Normal Communication Mode":

At first, just after the conference starts, the communication mode of each of the terminals 10 is the "normal communication mode". The process for each of the transition conditions will be explained in the following.

Transition Condition (a):

In the state of the "normal communication mode" (shown by "(1)" in FIG. 16), where the volume level V input from the microphone 114 is less than the lower limit threshold to the confidential communication Vt1 (nearly silent), or the volume level V is greater than the upper limit threshold to the confidential communication Vt2 (conversation with a loud voice), the communication mode transition determination unit 18 continues the present communication mode. This is because the user is determined to have a normal conversation in the case that the volume level is in the above state.

Transition Condition (b):

When the volume level V input from the microphone 114 is between the lower limit threshold to the confidential communication Vt1 and the upper limit threshold to the confidential communication Vt2, (appropriately low voice or whispering), the communication mode transition determination unit 18, transitions the present communication mode from the "normal communication mode" to the "interim confidential communication mode". The timer starts at this timing, to acquire a duration time t1. This is because the user is determine to have a confidential conversation in the case that the volume level is in the above state.

The communication mode transition determination unit 18 determines to turn on the "confidential communication mode" (see step S54 in FIG. 5). Moreover, the notice unit 19 notifies the user of starting the transition the "interim confidential communication mode".

(2) In the Case that the Present Mode is the "Interim Confidential Communication Mode":

Transition Condition (c):

When the present communication mode of the terminal 10 is the "interim confidential communication mode" (shown by "(2)" in FIG. 16), and the volume level input from the microphone 114 is greater than the upper limit threshold to the confidential communication Vt2 (conversation with a loud voice), the communication mode transition determination unit 18 returns the present communication mode from "interim confidential communication mode" to the "normal communication mode". The timer for the duration time t1, which started under the condition of (b), stops at this timing. This is because that user is determined to have a normal conversation in the case that the volume level in the above state.

The communication mode transition determination unit 18 determines to turn off the "confidential communication mode" (see step S60 in FIG. 5). Moreover, the notice unit 19 notifies the user of the transition to the "normal communication mode".

Transition Condition (d):

When in the state, as shown by "(2)" in FIG. 16, the volume level V input from the microphone 114 is less than the upper limit threshold to the confidential communication Vt2, and the duration time t1, which started under the condition of (b), becomes longer than the predetermined length T1 (conversation in an appropriately low voice volume level continues for enough time), the communication mode transition determination unit 18 transitions the present communication mode from the "interim confidential communication mode" to the "confidential communication mode".

The communication mode transition determination unit 18 maintains the "confidential communication mode" at "ON" and does not change the communication mode. The "interim confidential communication mode" and the "confidential communication mode" are the same in that image data and voice data are transferred only to the specified terminal. However, a condition for returning to the "normal communication mode" is different between the "interim confidential communication mode" and the "confidential communication mode". Moreover, the notice unit 19 notifies the user of the transition to the confidential communication mode.

Transition Condition (e):

When in the state, as shown by "(2)" in FIG. 16, the volume level V input from the microphone 114 is less that the upper limit threshold to the confidential communication Vt2, and the duration time t1, which started under the condition of (b), is shorter than the predetermined length T1 (conversation in an appropriately low voice, but short duration time), the communication mode transition determination unit 18 maintains the "interim confidential communication mode".

The communication mode transition determination unit 18 maintains the "confidential communication mode" at "ON" and does not change the communication mode. Moreover, the notice unit 19 notifies the user of a remaining time before the threshold T1.

(3) In the Case that the Present Mode is the "Confidential Communication Mode":

Transition Condition (f):

When the present communication mode of the terminal 10 is the "confidential communication mode" (shown by "(3)" in FIG. 16), and the volume level V input from the microphone 114 is less than the threshold to the normal communication mode Vt3 (conversation in a low voice continues), the communication mode transition determination unit 18 maintains the "confidential communication mode" at "ON". Moreover, when the timer for the duration time t2, which started under the condition of (g), which will be explained later, has been started, the timer is stopped at this timing.

Transition Condition (g):

When in the state, as shown by "(3)" in FIG. 16, the volume level V input from the microphone 114 is greater than the threshold to the normal communication mode Vt3, and the duration time t2 is shorter than a threshold T2 (conversation in a voice with volume level higher than a certain level, but short duration time), the communication mode transition determination unit 18 maintains the "confidential communication mode" at "ON". However, in this case, when the timer for the duration time t2 has not been started, the timer is started at this timing. When the timer has already started, the notice unit notifies the user of the remaining time before the threshold T2.

Transition Condition (h):

When in the state, as shown by "(3)" in FIG. 16, the volume level V input from the microphone 114 is greater than the threshold to the normal communication mode Vt3, and the duration time t2 becomes longer than the threshold T2 (conversation in a voice with volume level more than a certain level continues for enough time), the communication mode transition determination unit 18 transitions the present communication mode to the "normal communication mode".

The communication mode transition determination unit 18 determines the "confidential communication mode" to become "OFF" (see step S60 in FIG. 5). Moreover, the notice unit 19 notifies the user of the transition to the "normal communication mode". Moreover, when the timer for the duration time t2, which started under the condition of (g), has been started, the timer is stopped at this timing.

(Example of Transition to Confidential Communication Mode)

Figure 18:
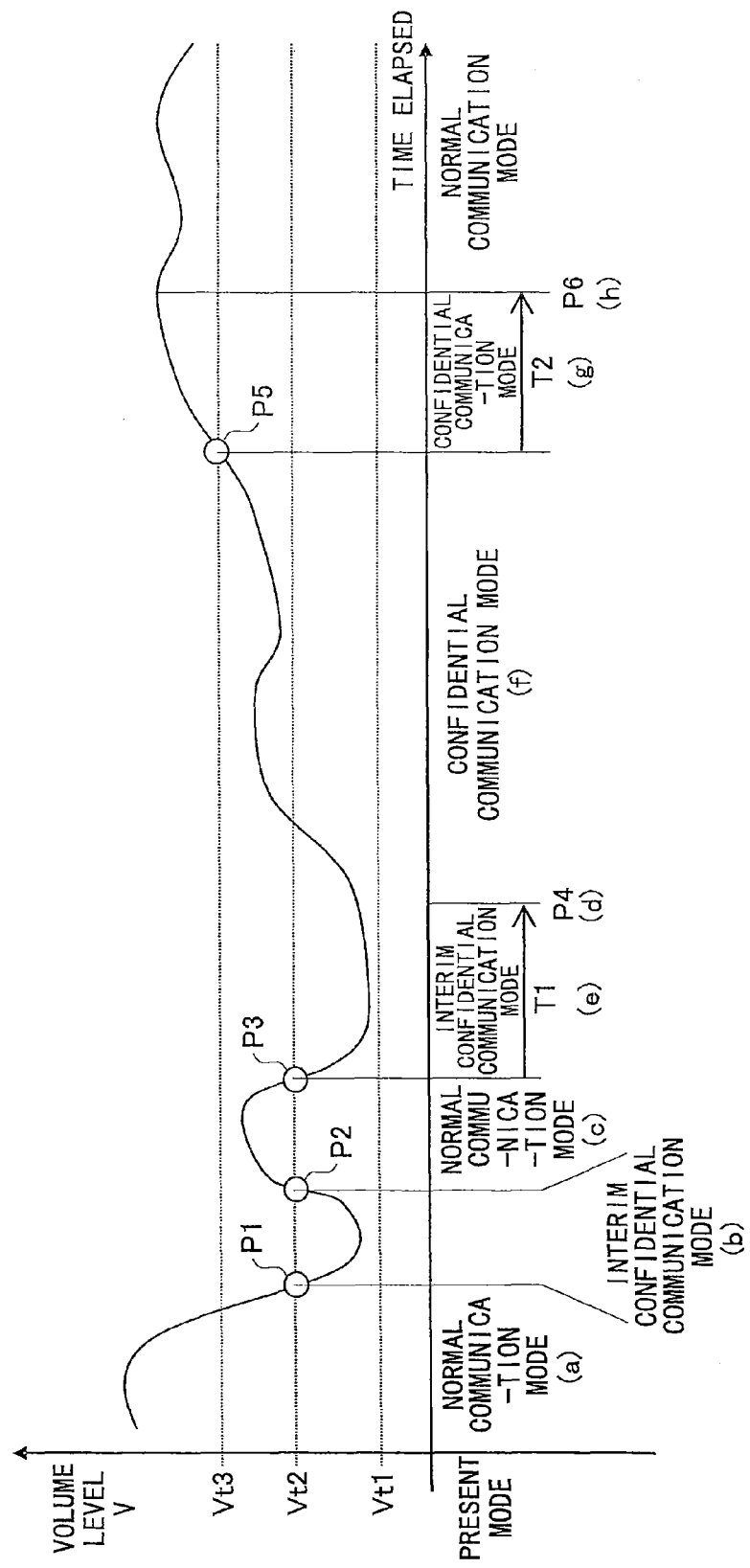
FIG. 18 is a timing chart illustrating an example of the transition between the communication modes according to the present exemplary embodiment.

FIG. 18 is an example of a timing chart illustrating a transition to the confidential communication mode according to the present exemplary embodiment. In FIG. 18, the abscissa indicates a time duration, and the ordinate indicates a volume level V of a voice input from the microphone 114. Moreover, the sections (a) to (g) represent time periods where the transmission terminal communicates in one of the communication modes.

Just after the conference starts, during participants talk in a normal volume level (section (a)), the communication mode is the "normal communication mode". Image data and voice data are transferred to all the destination terminals, which participate in the conference.

When the volume level of the voice input from the microphone 114 falls below Vt2, i.e. it is detected that the voice of the conversation becomes a low voice (at P1), the communication mode transitions to the "interim confidential communication mode". Image data and voice data sent from the request source terminal are transferred only to the destination terminal, which has been registered preliminarily in the destination list management table (see FIG. 9) or in the confidential communication group management table (see FIG. 11).

In the time period where the volume level V is between Vt1 and Vt2 (section (b)), the "interim confidential communication mode" continues. When the volume level V exceeds Vt2 (at P2) before the duration time becomes longer than the predetermined time T1, which is a threshold to transition to the "confidential communication mode", the communication mode transitions to the "normal communication mode". The image data and the voice data are transferred to all the destination terminals participating in the conference (section (c)).

When the volume level V of the voice of the conversation falls below Vt2 again, the communication mode transitions to the "interim confidential communication mode" (at P3). If the duration time of the time period, in which the volume level V is between Vt1 and Vt2 (section (e)), becomes longer than T1 (at P4), the communication mode transitions to the "confidential communication mode" (at (d)).

During the "confidential communication mode", even if the volume level V is greater than Vt2, but if the volume level V is less than Vt3, the "confidential communication mode" continues (section (f)). According to the above process, the transition to the "normal communication mode" by a temporary (accidental) high volume level can be prevented, and the user can continue the confidential communication at ease.

On the other hand, during the "confidential communication mode", when the volume level exceeds Vt3 (at P5), the "confidential communication mode" continues and time timer starts for the duration time t2 (section (g)). While the volume level V is greater than Vt3, when the duration time is longer than the predetermined time T2 (at P6), the communication mode transitions to the "normal communication mode" (at (h)). The image data and the voice data are transferred to all the destination terminals participating in the conference.

In the process of determining the transition of the communication mode, described as above, the volume level V of the voice inputted from the microphone 114 may be an average of volume level data within an interval including the decision time, taking account of a sudden change in the volume level due to noise or the like. Moreover, each of the threshold values Vt1, Vt2 and Vt3 is preferably determined to be an appropriate value, taking account of a characteristic of the microphone 114 connected to the terminal 10, or the like. Furthermore, the threshold values Vt1, Vt2 and Vt3 may be adjustable from the default value according to each user's preference.

In the present exemplary embodiment, the "interim confidential communication" is added to the "normal communication mode" and the "confidential communication mode", and the threshold for the volume level V is changed depending on the communication mode at present. However, as a simplified process, a process with only two kinds of communication modes, where the two thresholds Vt2 and Vt3 for decision are the same value, may be possible.

When the communication mode is the "confidential communication mode", since the volume level of the voice input from the microphone 114 of the request source terminal is low, a volume level of a sound output from the speaker of the destination terminal may be considerably low (e.g. less than Vt2). In such a case, the volume level of the sound output from the speaker of the destination terminal may be amplified (e.g. greater than Vt2), so that the user of the destination terminal can recognize the voice from the request source terminal. According to the above process, the user of the request source terminal can control (change) the transition of the communication mode according to the volume level of the input voice, and the user of the destination terminal can understand the voice input by the user of the request source terminal even in the confidential communication mode as in the normal communication mode.

[General Overview]

In the transmission system 1 according to the present exemplary embodiment, as explained above, in order to switch to confidential communication or return to normal communication, a participant (user) in a conference can control (change) a transition of the communication mode between the normal communication and the confidential communication by a volume level of a voice. Accordingly, the participant (user) need not operate, for example, a hardware key on the terminal, a key on a remote controller, or the like. The participant (user) can easily switch the communication mode between the normal communication mode and the confidential communication mode. That is, according to the present exemplary embodiment, the switching operation between the normal communication mode and the confidential communication mode becomes easier.

Further, the present invention is not limited to these embodiments, but various variations and modifications may be made without departing from the scope of the present invention. For example, the transmission system 1 according to the present exemplary embodiment is an example, and may have various variations of the system configuration depending on a use or a purpose.

For example, each of the functions, with which the management apparatus 50, the transmission terminal 10 and the relay device 30, shown in FIG. 5, are equipped, may be provided in the transmission system 1 as a whole. Accordingly, a part of the function may be realized in the other device. Furthermore, the transmission system 1 may include plural devices, and the above functions may be provided in any device.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD-ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present application is based on and claims the benefit of priority of Japanese Priority Application No. 2013-038907 filed on Feb. 28, 2013, with the Japanese Patent Office, the entire contents of which are hereby incorporated by reference.

What is claimed is:

1. A transmission terminal connected to a management apparatus, which stores therein, for a first communication mode, destination information in association with each of a plurality of transmission terminals, via a network, comprising:
   a transmitter that sends data including at least voice data;
   a voice input interface that inputs the voice data; and
   processing circuitry that determines whether the transmission terminal is in the first communication mode or not based on an input volume level of the voice data input by the voice input interface, wherein
   when the processing circuitry determines that the transmission terminal is in the first communication mode, the data sent by the transmitter is relayed only to an other transmission terminal of the transmission terminals that communicate with the transmission terminal, the other transmission terminal corresponding to the destination information associated with the transmission terminal in the management apparatus.

2. The transmission terminal, as claimed in claim 1, further comprising:
   a memory that stores a first volume level value, greater than zero, and a second volume level value, greater than the first volume level value,
   wherein the processing circuitry determines that when the input volume level is greater than or equal to the first volume level value and the input volume level is less than or equal to the second volume level value, the transmission terminal is in the first communication mode, and that when the input volume level is less than the first volume level value or the input volume level is greater than the second volume level value, the transmission terminal is in a second communication mode, where the data are relayed to all the transmission terminals that communicate with the transmission terminal.

3. The transmission terminal, as claimed in claim 2, wherein when the input volume level becomes greater than the second volume level value before a first predetermined time elapses since the processing circuitry determines that the transmission terminal is in the first communication mode, the processing circuitry determines that the transmission terminal is in the second communication mode.

4. The transmission terminal according to claim 3, wherein when the input volume level is greater than a third volume level value, which is greater than the second volume level value, for a period of a second predetermined time after the first predetermined time has elapsed since the processing circuitry determines that the transmission terminal is in the first communication mode, the processing circuitry determines that the transmission terminal is in the second communication mode.

5. The transmission terminal according to claim 4, further comprising a display that gives a notice to a user of the transmission terminal of at least one of the destination, a remaining time before the first predetermined time elapses, and a remaining time before the second predetermined time elapses.

6. A transmission system, which transmits data including at least voice data between a plurality of transmission terminals via a network, the system comprising:
   a memory that stores, for a first communication mode, destination information in association with each of the plurality of transmission terminals;
   a receiver that receives data sent from a first transmission terminal;
   a processing circuitry that determine whether the first transmission terminal is in the first communication mode or not based on an input volume level of the voice data in the data; and
   a relay terminal that, when the processing circuitry determines that the first transmission terminal is in the first communication mode, relays the data received at the receiver only to a second transmission terminal of the transmission terminals that communicate with the first transmission terminal, the second transmission terminal corresponding to the destination information associated with the first transmission terminal in the memory.

7. The transmission system, as claimed in claim 6, wherein the memory stores a group to which the first transmission terminal and the second transmission terminal belong, and when the processing circuitry determines that the first transmission terminal is in the first communication mode, the relay terminal relays the data received at the receiver only to a transmission terminal, which belongs to the group, of the transmission terminals that communicate with the first transmission terminal.

8. A non-transitory computer-readable storage medium storing a program for causing a computer to perform a process of transmitting data from a transmission terminal, which is connected to a management apparatus, storing, for a first communication mode, destination information in association with a plurality of transmission terminals, via a network, the process comprising:
   converting an input voice into voice data;
   sending data including at least the voice data; and
   determining whether the transmission terminal is in the first communication mode or not based on an input volume level of the voice data, wherein
   when the transmission terminal is determined to be in the first communication mode, the data is relayed only to an other transmission terminal of the transmission terminals that communicate with the transmission terminal, the other transmission terminal corresponding to the destination information associated with the transmission terminal in the management apparatus.

* * * * *